(12) United States Patent
Williams

(10) Patent No.: US 11,230,813 B1
(45) Date of Patent: Jan. 25, 2022

(54) AUTOMATED ROAD-RAIL TRANSPORTATION SYSTEM WITH SIDE STABILIZATION

(71) Applicant: Thomas Holtzman Williams, Longmont, CO (US)

(72) Inventor: Thomas Holtzman Williams, Longmont, CO (US)

(*) Notice: Subject to any disclaimer, the term of this patent is extended or adjusted under 35 U.S.C. 154(b) by 0 days.

(21) Appl. No.: 17/072,664

(22) Filed: Oct. 16, 2020

(51) Int. Cl.
  *E01B 25/28* (2006.01)
  *B61B 15/00* (2006.01)
  (Continued)

(52) U.S. Cl.
  CPC .............. *E01B 25/28* (2013.01); *B60F 1/005* (2013.01); *B60F 1/04* (2013.01); *B61B 15/00* (2013.01);
  (Continued)

(58) Field of Classification Search
  CPC . E01B 25/28; E01B 7/00; B61B 13/00; B61B 15/00; B60F 1/00; B60F 1/005;
  (Continued)

(56) References Cited

U.S. PATENT DOCUMENTS

| | | | |
|---|---|---|---|
| 35,244 A * | 5/1862 | McNair | B60F 1/046 105/215.2 |
| 1,827,898 A * | 10/1931 | Moore | B60F 1/04 105/72.2 |

(Continued)

FOREIGN PATENT DOCUMENTS

| | | |
|---|---|---|
| EP | 0116021 B1 | 8/1984 |
| WO | WO2012147096 | 11/2012 |

*Primary Examiner* — Zachary L Kuhfuss

(57) ABSTRACT

A track system for transporting people and goods with two support rails plus a side stabilizer mechanism associated with one or both rails. The side stabilizer is employed to provide lateral stability and keep a vehicle's rail wheels on the support rails. The side stabilizer may be a protruding bar or a recessed groove. This track system enables vehicles to change support rails at a junction with stationary non-switching rails. Rail wheels roll over the support rails and support the weight of the vehicle while on the rails. Interior side rollers contact the interior of the bar side stabilizer and maintain the vehicle's rail wheels centered over the support rails. Exterior side rollers contact an exterior of one of the bar side stabilizers and forces the vehicle to stay on the current track or to change to a different track. Recessed grooves and dual-flange wheels can alternately provide side stabilization. At track junctions the vehicle can change direction, pass other vehicles, change lanes, turn-around, and load or unloading passengers or freight. This track system may be integrated with a conventional road system or with a controlled-access (autobahn/interstate) highway system. Optional road wheels allow the vehicle to exit the track system and travel on conventional roads, or dual-mode road/rail wheels can be used for travel on both track and pavement. An automatic traffic control system controls traffic on the track system and enables self-driving vehicles. Powering for the vehicles can be provided by the track system. The system can be miniaturized and used for the model/toy market.

20 Claims, 12 Drawing Sheets

(51) Int. Cl.
*B60F 1/04* (2006.01)
*B60F 1/00* (2006.01)

(52) U.S. Cl.
CPC ....... *B60F 2301/04* (2013.01); *B60F 2301/10* (2013.01)

(58) Field of Classification Search
CPC ........ B60F 1/04; B60F 1/043; B60F 2301/04; B60F 2301/10; Y02T 30/00
USPC ........... 104/130.07, 242, 243, 245; 105/72.2, 105/215.2
See application file for complete search history.

(56) References Cited

U.S. PATENT DOCUMENTS

| | | | | |
|---|---|---|---|---|
| 1,854,487 | A * | 4/1932 | Ronk | E01B 25/28 246/468 |
| 1,938,049 | A * | 12/1933 | Serrano | B60F 1/043 105/215.2 |
| 2,039,489 | A * | 5/1936 | Messick | B60F 1/046 105/215.2 |
| 2,088,522 | A * | 7/1937 | Klima | B60F 1/04 105/72.2 |
| 2,116,786 | A * | 5/1938 | Gross | B60F 1/005 105/72.2 |
| 3,002,469 | A * | 10/1961 | Wanner | B60F 1/04 105/215.2 |
| 3,338,184 | A * | 8/1967 | Fisher | B60F 1/043 105/215.2 |
| 3,593,667 | A * | 7/1971 | Morris | B61C 11/00 104/120 |
| 3,892,187 | A * | 7/1975 | White, Jr. | B60F 1/043 105/75 |
| 3,902,428 | A * | 9/1975 | Peveraro | E01B 25/00 104/130.07 |
| 4,355,584 | A * | 10/1982 | White, Jr. | B61J 3/12 105/72.2 |
| 4,497,257 | A * | 2/1985 | White, Jr. | B60F 1/043 105/215.2 |
| 4,537,137 | A * | 8/1985 | White, Jr. | B60F 1/043 105/215.2 |
| 4,671,185 | A * | 6/1987 | Anderson | E01B 25/28 104/130.07 |
| 6,314,890 | B1 * | 11/2001 | Geldbaugh | B60K 17/00 104/242 |
| 6,324,994 | B1 * | 12/2001 | Glenn | B62M 6/75 105/72.2 |
| 6,357,358 | B2 * | 3/2002 | Henderson | B60L 13/04 104/130.02 |
| 6,450,103 | B2 | 9/2002 | Svensson | |
| 7,426,424 | B2 * | 9/2008 | Moriguchi | B61L 23/005 104/130.07 |
| 7,624,685 | B2 * | 12/2009 | Andreasson | B61B 13/00 104/130.07 |
| 8,869,707 | B2 * | 10/2014 | Kawauchi | E01B 7/00 105/72.2 |
| 9,981,517 | B2 * | 5/2018 | Krols | B60F 1/043 |
| 2001/0039901 | A1 * | 11/2001 | Hossfield | B62D 1/265 104/130.07 |
| 2007/0214995 | A1 * | 9/2007 | Publicover | B60F 1/02 104/287 |
| 2009/0050011 | A1 * | 2/2009 | Li | B60F 1/04 104/130.01 |
| 2010/0211238 | A1 * | 8/2010 | David, Jr. | E01B 25/00 701/20 |
| 2010/0294848 | A1 * | 11/2010 | Bullis | B60B 17/0072 238/3 |
| 2012/0304885 | A1 * | 12/2012 | Vysochan | B60L 13/003 104/290 |
| 2013/0104769 | A1 * | 5/2013 | Lebert | B61F 13/00 105/215.2 |
| 2013/0186297 | A1 * | 7/2013 | Kissel | B61L 25/02 104/124 |
| 2014/0190366 | A1 * | 7/2014 | Mukai | E01B 7/00 104/130.01 |
| 2015/0224839 | A1 * | 8/2015 | Krols | B61D 15/00 105/72.2 |
| 2017/0183827 | A1 * | 6/2017 | Murase | B61B 13/00 |
| 2019/0359020 | A1 * | 11/2019 | Krols | B61F 13/00 |
| 2021/0237526 | A1 * | 8/2021 | Williams | B60W 40/00 |

* cited by examiner

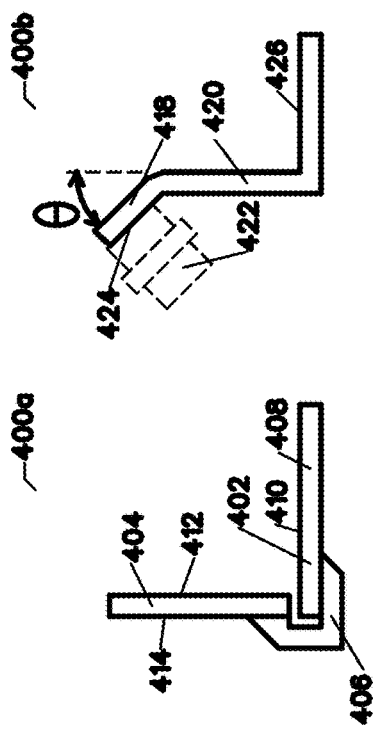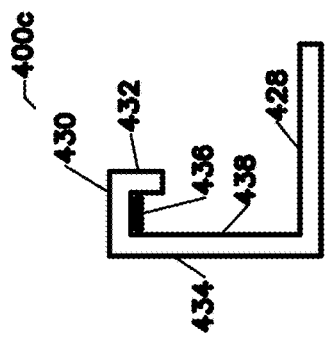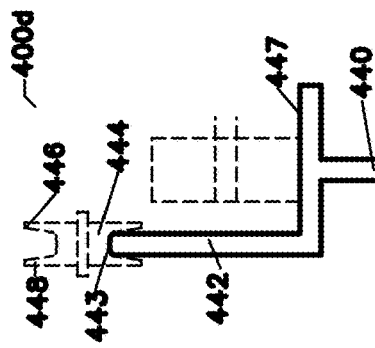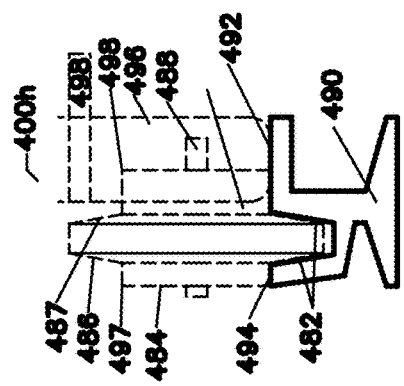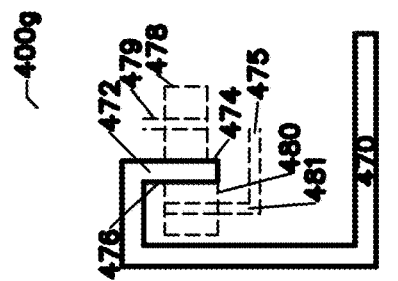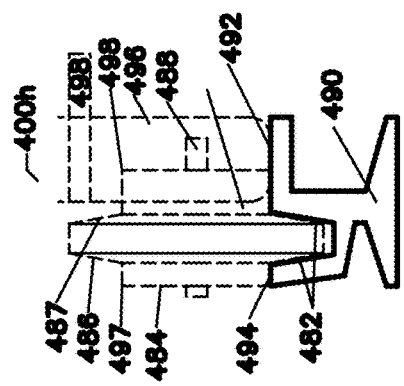

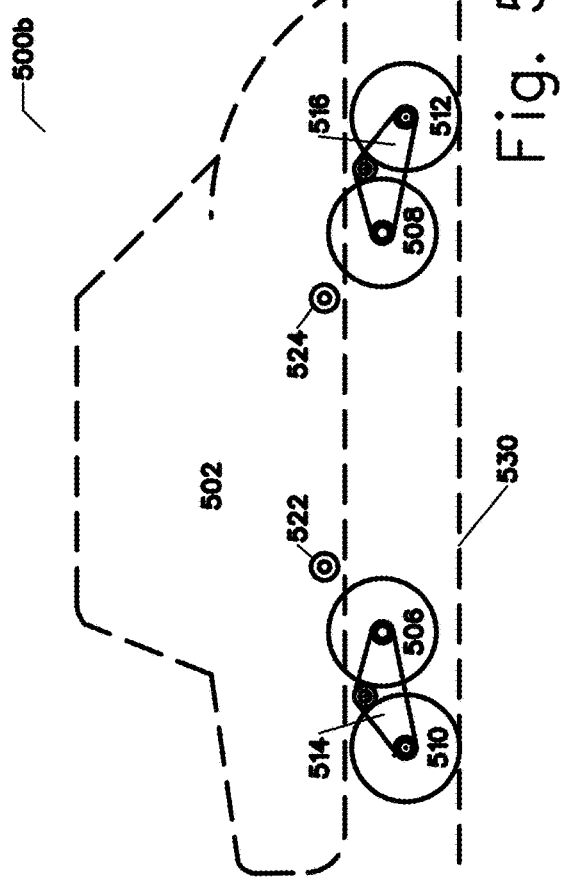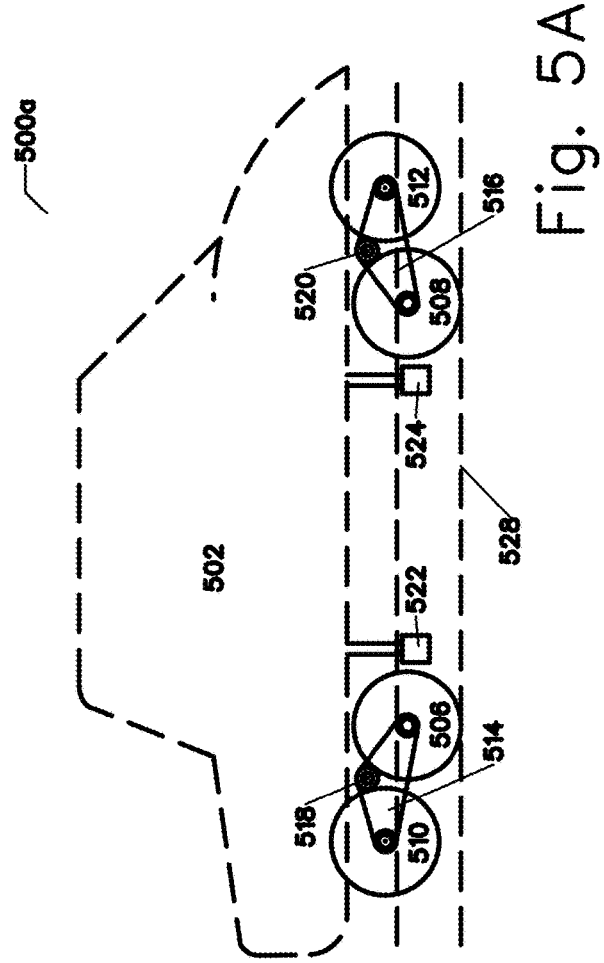

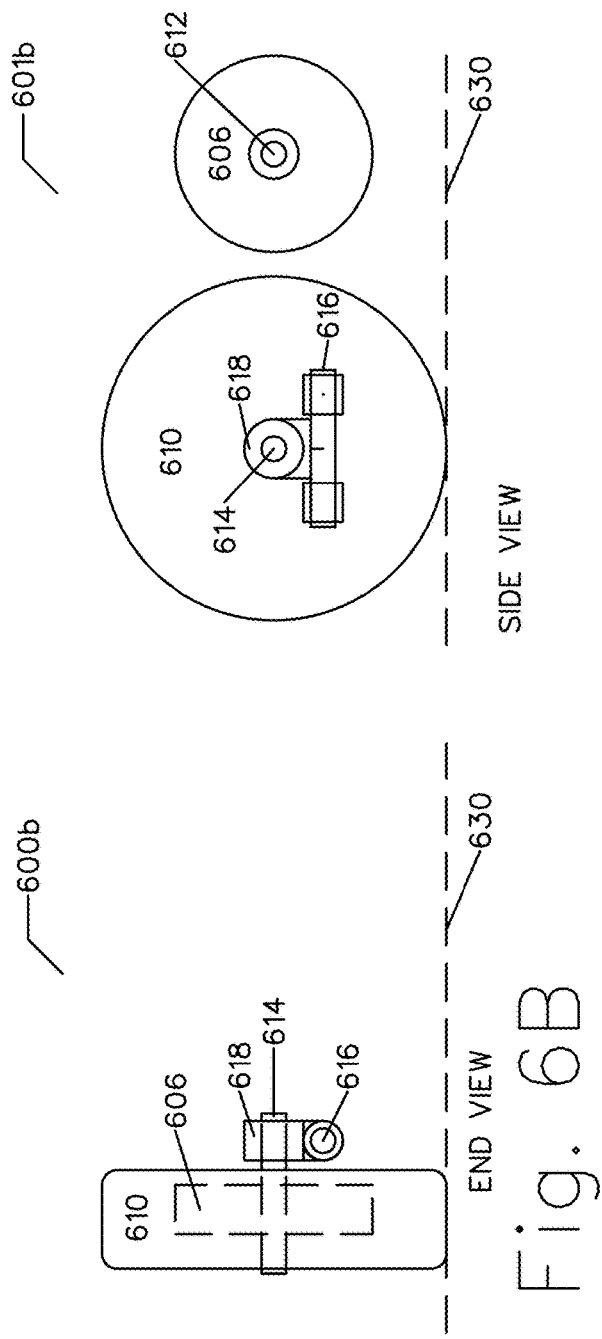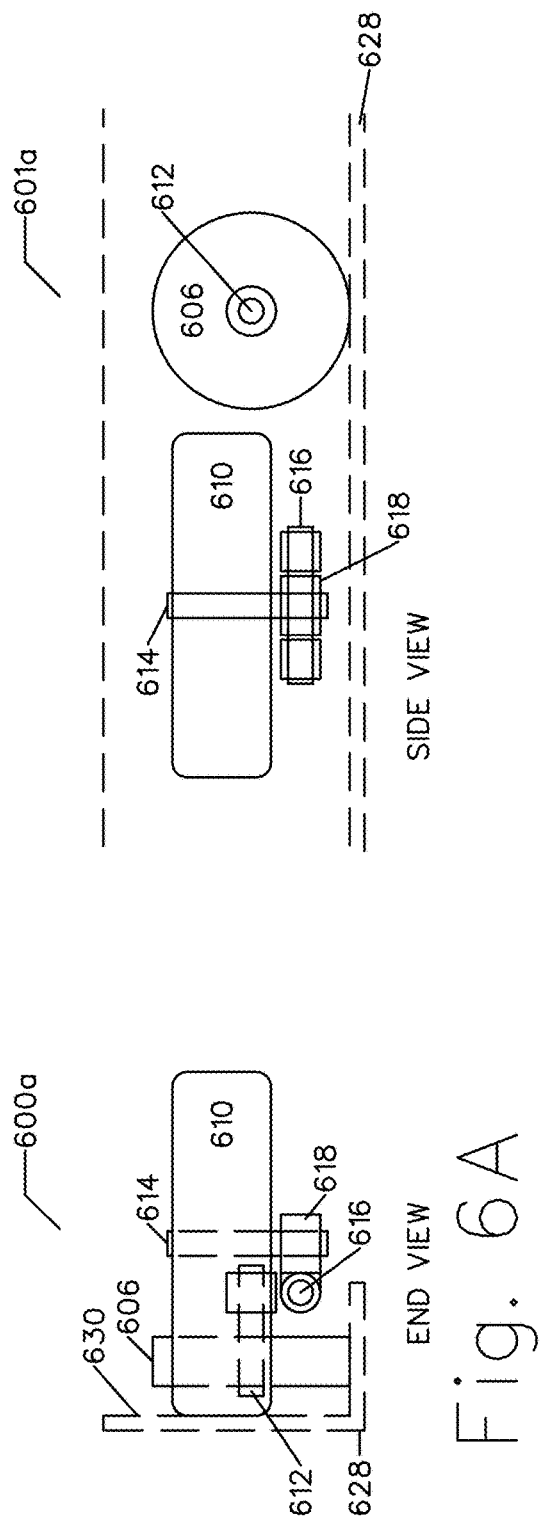

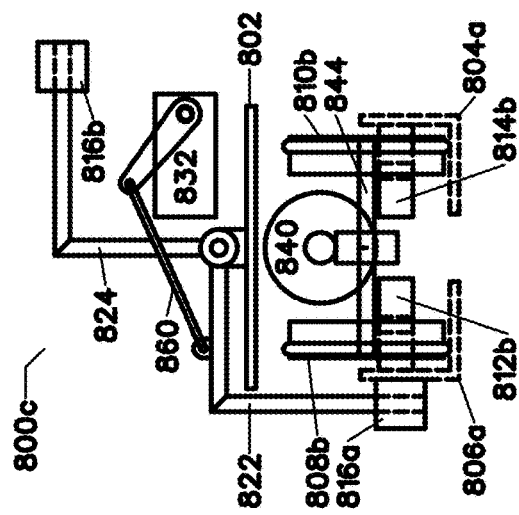
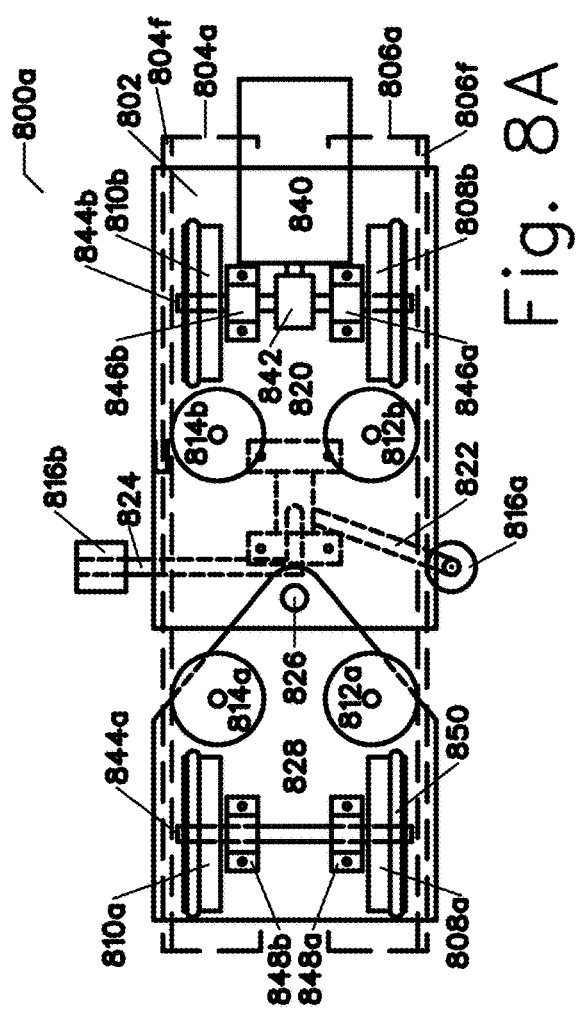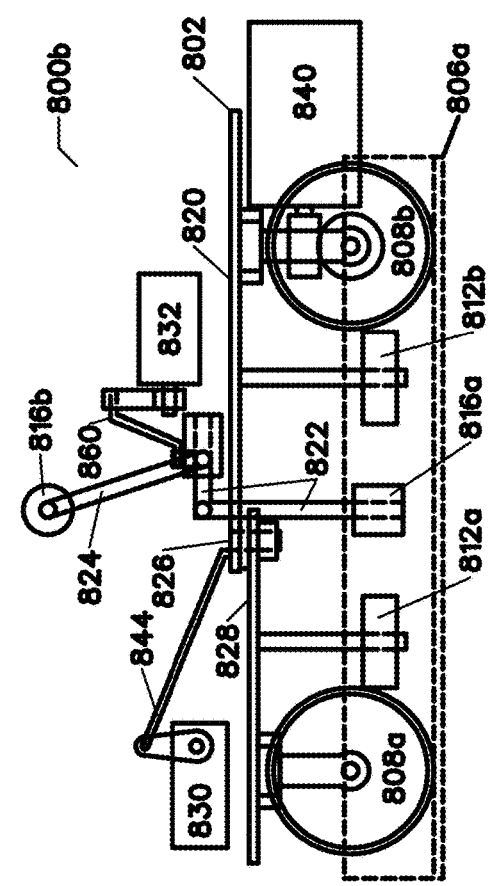

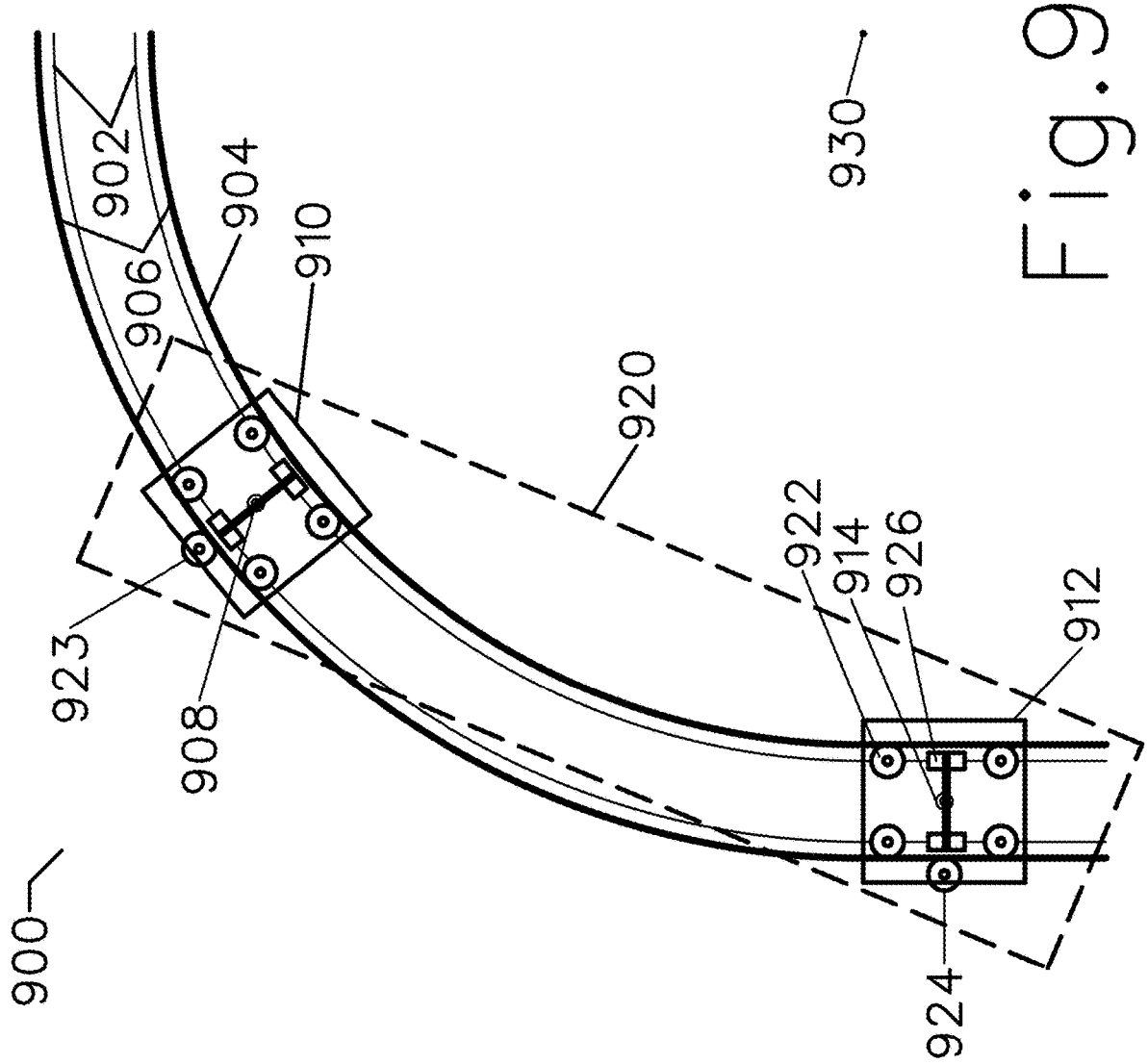

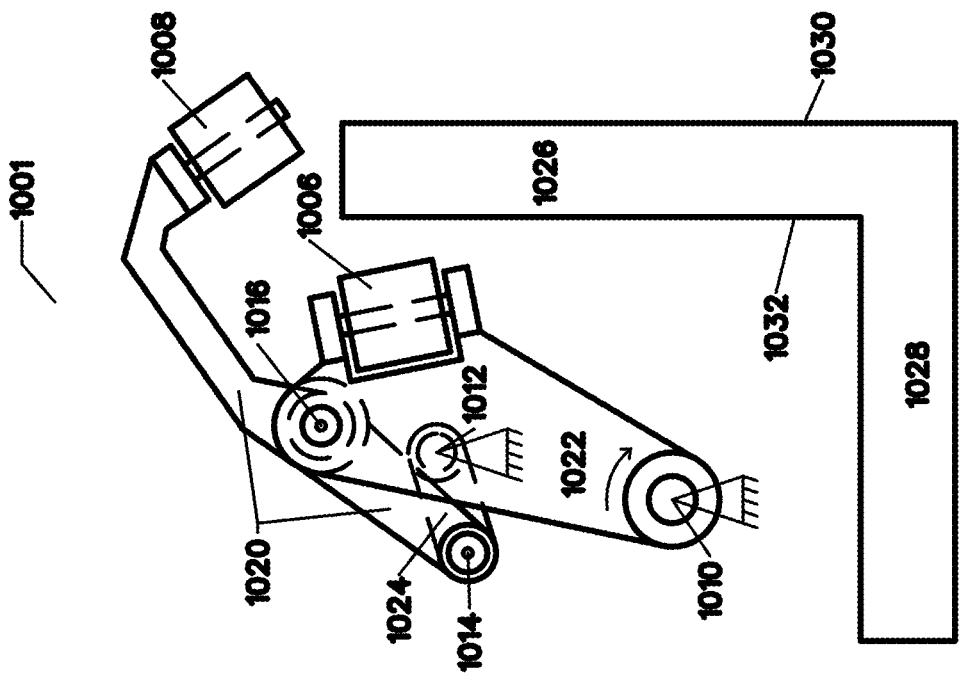
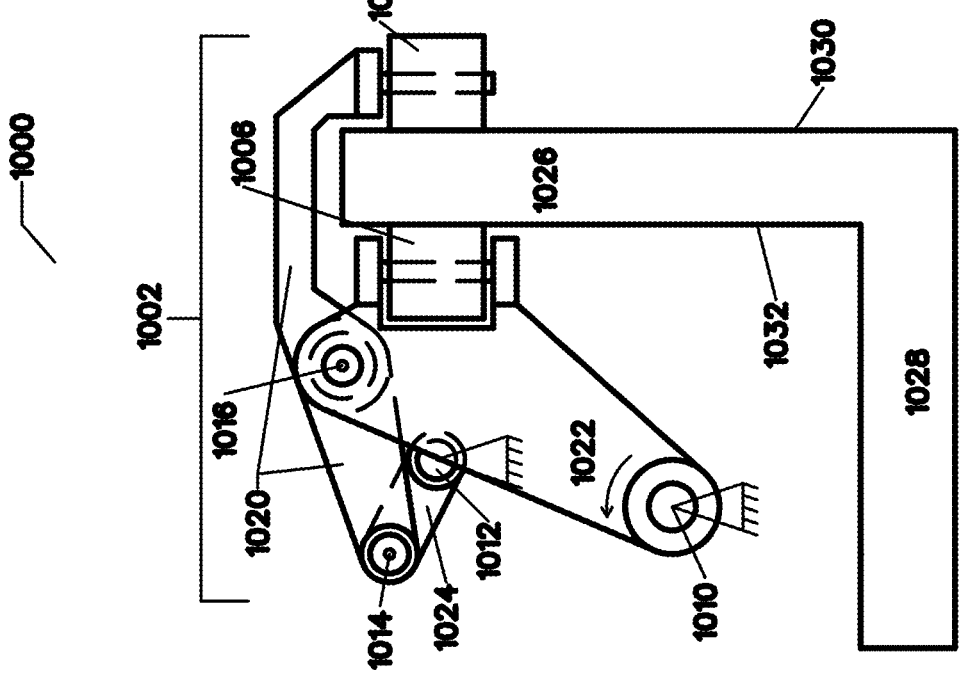
Fig. 10A
Fig. 10B

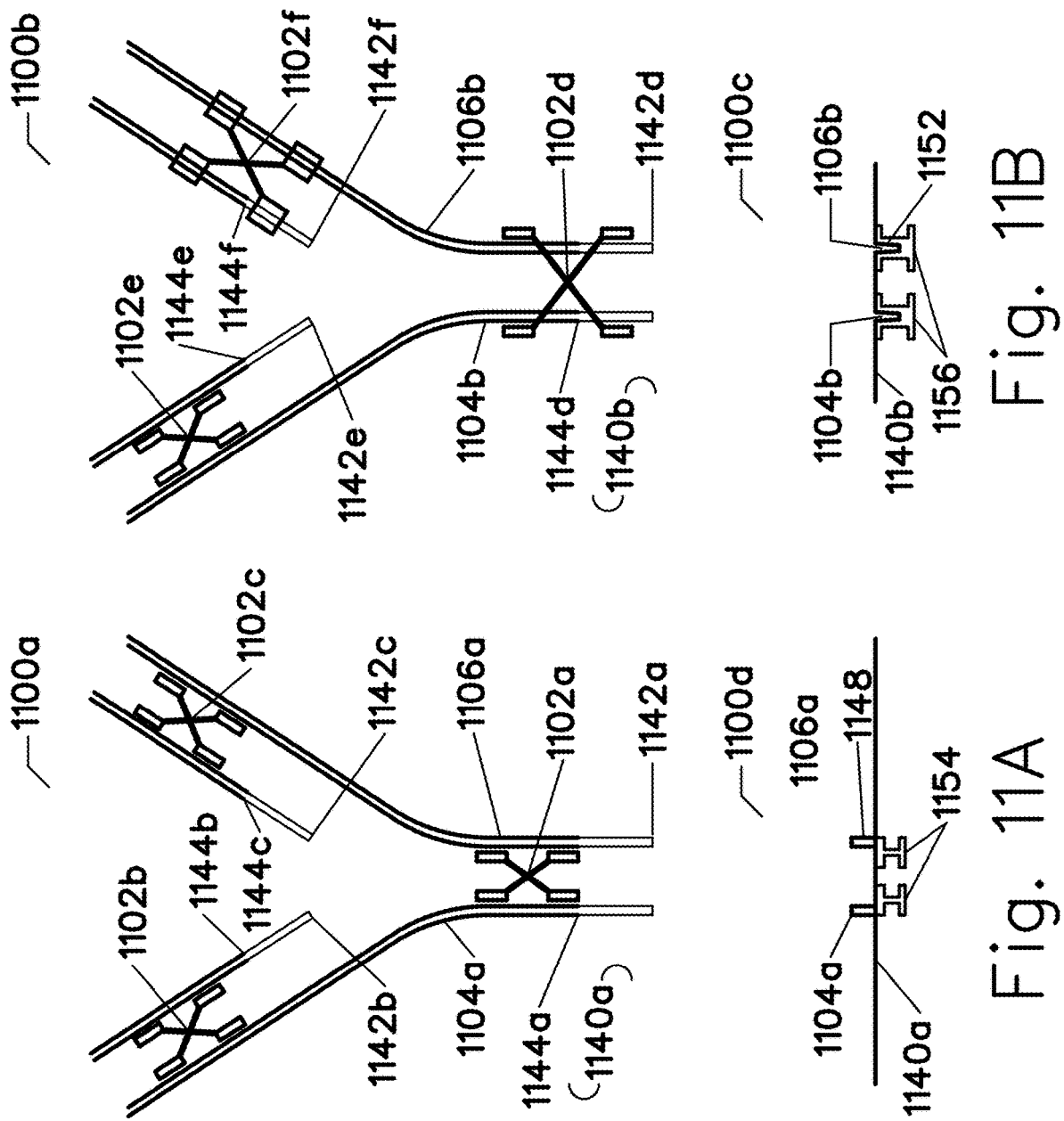

AUTOMATED ROAD-RAIL TRANSPORTATION SYSTEM WITH SIDE STABILIZATION

CROSS REFERENCE TO RELATED APPLICATIONS

This application claims benefit and priority of US Provisional Patent Application Ser. No U.S. 62/918,544 filed Feb. 4, 2019 and US Non-Provisional Patent Application Ser. No U.S. Ser. No. 16/780,015 filed Feb. 3, 2020. The disclosures of this application are incorporated herein by reference in their entireties.

FIELD

This invention relates to rail systems in general, and to vehicles that can operate on both rails and roads, and to toy models derived from such systems.

BACKGROUND

There is currently a need for improved transportation worldwide, complicated by high population density and climate change from use of fossil fuels for transportation. Rails are an efficient method for transporting people and material due to low rolling resistance on rails, relative to roads. Rails can also have advantages of cheap construction and have an ability to power the vehicles from electricity flowing through rails. Rails are also an efficient use of land relative to roads. However, traveling on foot potentially relatively long distances from homes or businesses to and from rail terminals is a problem. Disposing of a commuter vehicle after getting to the rail terminal is also a problem, as is procuring another commuter vehicle when getting off of the rail. Bicycles are an efficient mode of transportation and can sometimes be carried on a passenger train but cannot be used by all commuters and are not suited for inclement weather.

Currently there is an interest in self-driving or automated vehicles. Autonomous or self-driving vehicles are useful for delivering goods and transporting people. If autonomous vehicles are used in an automatic traffic control system, other advantages accrue, such as route planning, collision avoidance, elimination of traffic signals, stop signs, and higher traffic density.

Self-driving cars are one type of automated vehicle that hold promise for the future, but just add to traffic congestion and environmental damage with essentially the same use of resources (steel, rubber, fuel or electrical energy) as cars with drivers.

It is an object of this invention to make a transportation system with vehicles that can transition between road and rail travel modes. On the road, vehicles can be driven, or operated autonomously. When a vehicle is operating autonomously, it can be part of a computer-controlled traffic system. On the rails the vehicles are preferably controlled by the traffic control system. While on the rail the vehicles can change routes with stationary, non-switching tracks.

It is also an object to improve safety while traveling and to reduce fuel and electricity consumption, decreasing the rate of environmental damage, particularly from $CO_2$. It is also an object of this invention to enable Internet-connected cars. It is also an object of this invention to enable transportation as a service, rather than car ownership. It is also an object of this invention to make peoples' lives easier by spending less time traveling and being able to do other things while traveling besides driving.

A track or railroad track contains several elements such as rails, ties, attachments, a foundation, and support. The term "road" is not limited to paved surfaces but can include unpaved surfaces or off-road terrain.

The term "side stabilizer" can also be referred to as a "lateral stabilizer".

Thus, it is an object of this invention to:
1 Minimize environmental damage from transportation systems.
2. Enable efficient vehicle movement when burning fossil fuels for transportation can no longer be tolerated. That is, to be powered by renewable energy.
3. Improve safety.
4. Free drivers from the burden of driving.
5. Extend a transportation infrastructure using less resources.
6. Minimize travel time.
7. Increase rail capacity by decreasing the spacing between cars or joining cars to reduce air resistance.
8. Allow a tractor vehicle to pull unpowered cars or carry road-only vehicles.

SUMMARY OF THE INVENTION

A track system comprised of tracks with two support rails and one or two side stabilizers. Side stabilizers may be exterior bars or recessed grooves. Vehicles have rail wheels that are supported and maintained over the support rails with lateral guidance from the side stabilizer. An interior side roller and a retractable exterior side roller contact a side stabilizer bar for guidance. A dual-flanged wheel inserted into a recessed groove is an alternate side stabilizer method for lateral guidance. At a decision point before a junction, vehicles change tracks by releasing the current side stabilizer and engaging the opposite side stabilizer on the other side. This transportation system optionally allows vehicles to transition between road travel and rail travel. In one embodiment dual-mode wheels are used for both road and rail support. In another embodiment different single-mode wheels are used for road travel than for rail travel. Rail wheels are made without flanges, allowing track switching. A lane of a conventional highway system can be used as a track system. Power for vehicle operation and battery charging can be provided by the tracks. In one embodiment the side stabilizer can be a vertical bar, and in an alternate embodiment the side stabilizer can be a recessed groove.

DESCRIPTION OF FIGURES

FIGS. 4A-H illustrate alternate sectional views of possible rail shapes.

FIG. 5A-5B is a drawing of a vehicle using pivots that support single-mode road wheels and rail wheels.

FIG. 6A is a set of views of a vehicle on a rail with road wheels that pivot to become interior side rollers.

FIG. 6B is a set of views of the vehicle of FIG. 6A running on a road.

FIG. 8A is a top view drawing of a model vehicle with dual-mode wheels.

FIG. 8B is a side view drawing of a model vehicle with dual-mode wheels.

FIG. 8C is a rear-view drawing of a model vehicle with dual-mode wheels.

FIG. 9 is a long vehicle making a turn around a tight radius.

FIG. 10A is a view of a grab arm for contacting a side stabilizer in locked position.

FIG. 10B is a view of a grab arm for contacting a side stabilizer in open position FIG. 11A is a comparison view of a track system junction using a vertical bar for side stabilization FIG. 11B is a comparison view of a track system junction using recessed groove for side stabilization.

DESCRIPTION FIG. 1

Figure 1:
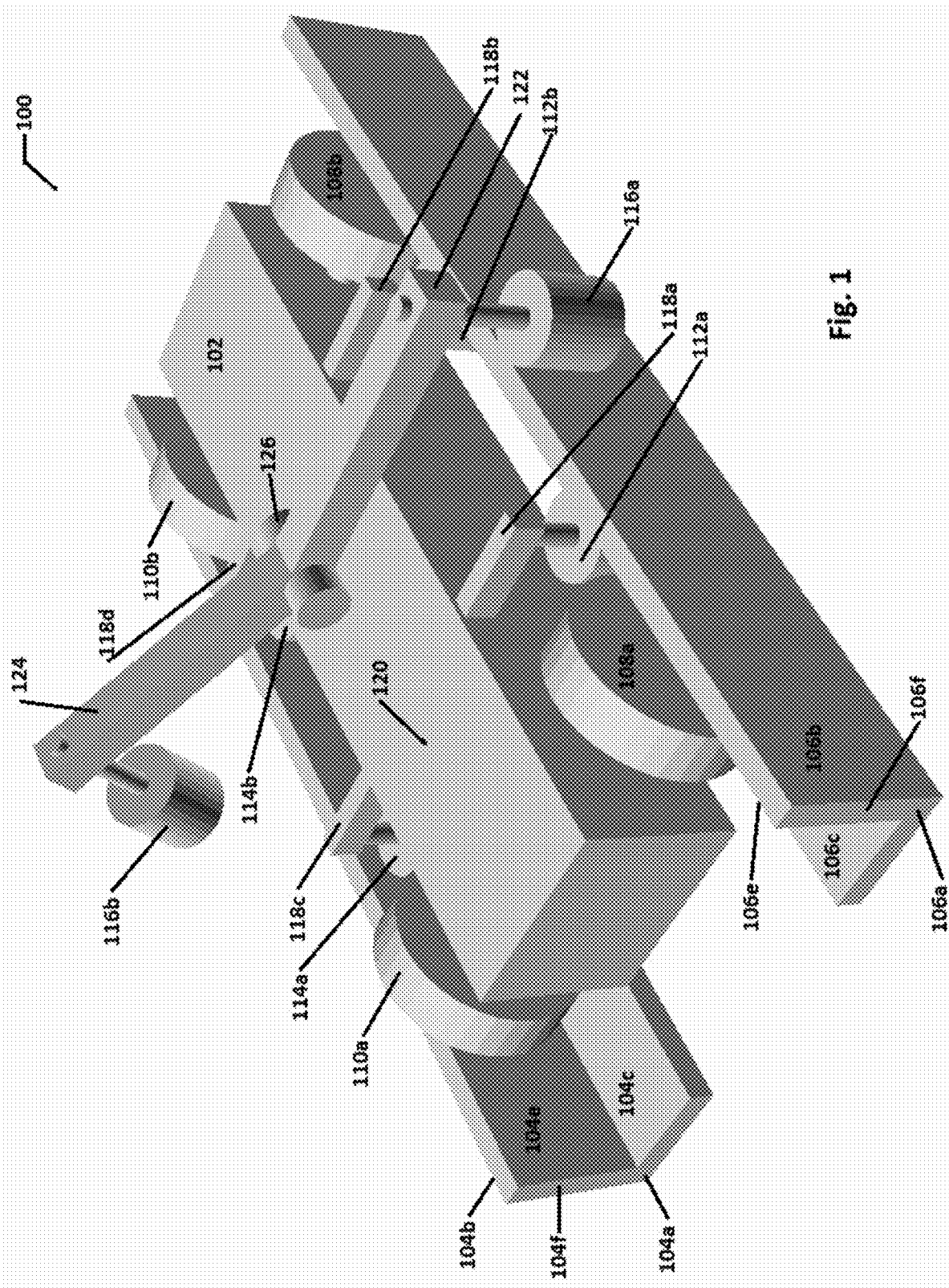
FIG. 1 is a perspective rendering of a vehicle on a pair of rails and having bar side stabilizers.

FIG. 1 is a perspective rendering 100 of a track system with a vehicle 102. Tracks are comprised of a left support rail 106a, a right support rail 104a, and one or two side stabilizer bars such as 104f and 106f, as well as a support structure (not illustrated). The vehicle 102 is rolling over the pair of rails, right rail 104a and left rail 106a. The terms left and right are referenced to the direction of vehicle travel, which is towards the bottom-left. Each rail has a stabilizer bar, such as right stabilizer bar 104f and left stabilizer bar stabilizer 106f, which in this drawing are vertical bars attached to the rails. The stabilizer bars are shown as integral parts of the rails but could alternately be attached with connecting brackets. Support rails have horizontal surfaces 104c and 106c. Side stabilizer bars 104f and 106f have an interior vertical surface 104e and 106e, and external vertical surfaces 104b and 106b. Four rail wheels 108a, 108b, 110a and 110b support the vehicle on the horizontal surfaces 104c and 106c of the support rails. In this embodiment, the wheels may be suitable for operation on either rails or on roads, and so are called dual-mode wheels.

Fixed interior side rollers 112a and 112b contact the interior left interior vertical surface 106e while interior side rollers 114a and 114b clear the interior right vertical surface 104e by a short clearance distance. This prevents variable side stabilizer spacing tolerance causing "roller pinch". Interior side roller supports 118a-d connect the interior side rollers to the vehicle's chassis 120. Left exterior side roller 116a contacts the exterior of the left side stabilizer 106b and holds the interior side rollers 112a and 112b against the interior of the left rail 106e. Left exterior side roller 116a is held by left pivot arm 122. Right exterior side roller 116b is raised by right pivot arm 124. Both pivot arms connect to rotatable pin 126, which allows arm rotation, and is rotatably connected to chassis 120 (bearings not illustrated). Another function of exterior the side rollers is to allow the vehicle 102 to select a desired track when the vehicle approaches a junction. For on-road operation both exterior side rollers can be elevated or retracted. Likewise, exterior and interior side rollers can also be retracted for lowering air resistance while on-road or for aesthetic reasons. A floor (not illustrated) may be provided between the horizontal surfaces 104c and 106c. The floor may optionally be capable of supporting less weight than the rails, or may be used for track switching, as will be explained later.

In a nominal embodiment the rail spacing can be 4'-8.5", allowing conventional trains to use the track system's straight sections, although conventional trains with flanged wheels cannot use the passive track changing system described herein. Interior portions of horizontal surfaces 104c and 106c can optionally be slightly sloped towards the center, like conventional train rails.

Side stabilizer 104f and 106f may contain power strips (not illustrated) that can be used to provide vehicle power while the vehicle is on the rail, and the steel construction of the rail can provide a return path for electrical current. Likewise an overhead wire, not illustrated, can provide power for operating the vehicle. The electrical power can also charge on-board batteries that can power the vehicle while it is traveling on the road. Battery charging can be accomplished while the vehicle is stopped, such as for loading or unloading.

While traveling on a rail, normally only one side stabilizer is available, and the rail vehicles attach to it. However when approaching a switch point, the opposing side stabilizer may appear, for example by rising out of the road. For road operation, no side stabilizer is necessary, but may optionally be provided for stability or breaking.

While on a road the vehicle 102 can be driven by a human or be a self-driving car and optionally part of an automated traffic control system (TCS). While operating on the rail it is preferable that the vehicle control be done by the TCS. The TCS can control vehicle spacing, routes, and speed.

Many options are available for steering. While on the support rails, the steering may be disabled if track curves are not sharp and vehicle 120 has a short wheelbase. For sharp track curves, or for long vehicles, 4-wheel steering is an option. While vehicle 120 is traveling on support rails with side stabilization, a suspension can optionally employ casters on the wheels 108a, 108b, 110a, and 110b, relieving the driver of steering.

DESCRIPTION FIG. 2

Figure 2:
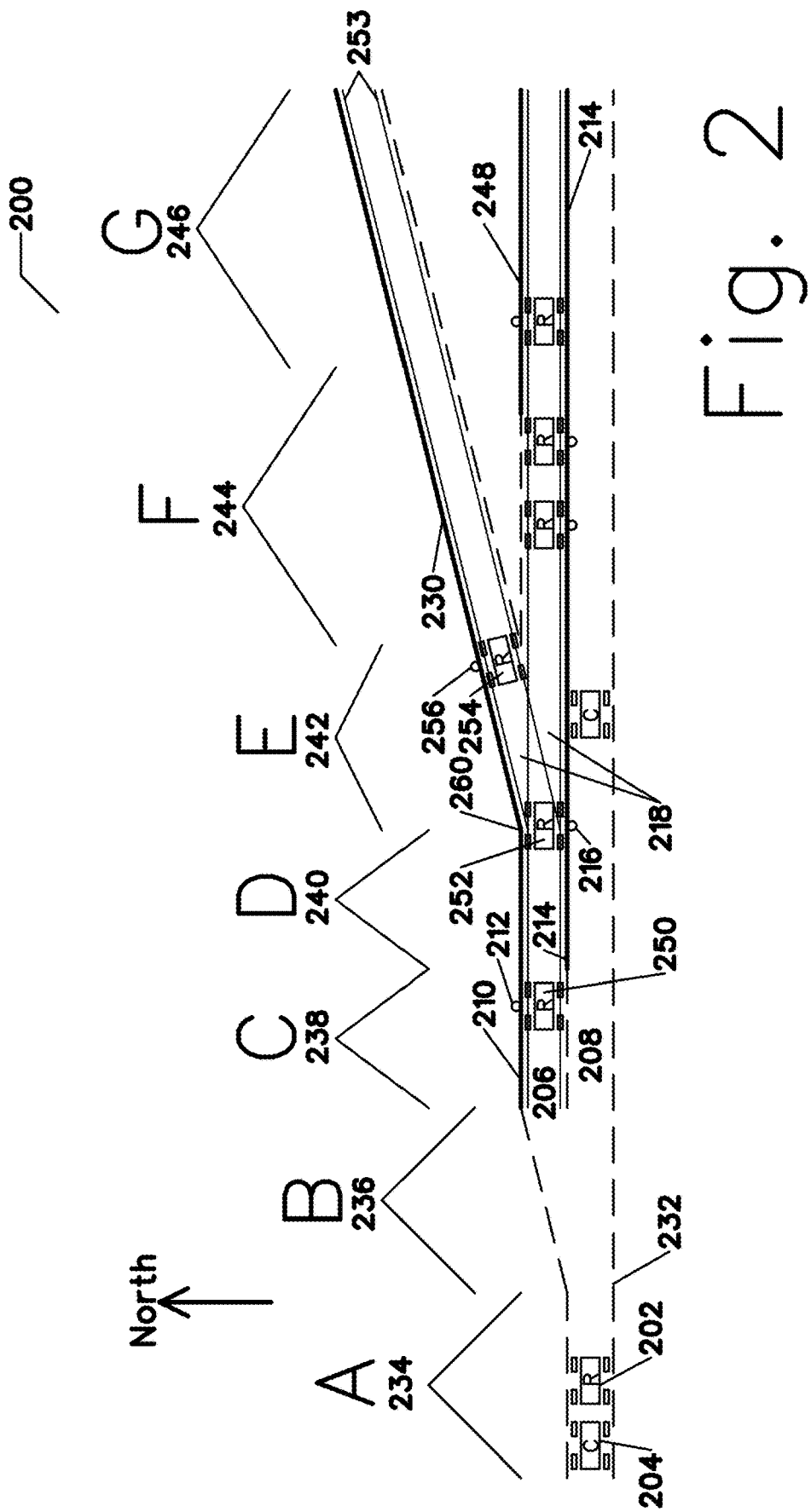
FIG. 2 is top view of a hybrid track system with multiple junctions integrated with a conventional road.

FIG. 2 is an overhead view 200 of a track system integrated with a paved road. A dashed line (e.g. 232) indicates lane markers, and solid thick lines (e.g. 230) indicate side stabilizer (bar or recessed groove) and accompanying support rails, which are illustrated as thin solid lines (e.g. 253). All vehicle traffic is to the right, or east. In segment 234 (A) single lane traffic on a conventional road carries both a conventional car 204, marked "C" and a rail vehicle 202, marked R. A second lane 206 to the left (relative to vehicle travel) is created at section 236 (B) and only rail vehicles may enter this new lane. Conventional vehicles must continue straight in the right lane 208. At section 238 (C) a left side stabilizer 210 rises out of the ground and underneath rail support for a rail vehicle begins. Rail vehicle 250 traveling on the support rail latches onto the left side stabilizer 210 using its left exterior side roller 212.

At section 240 (D) a right-side stabilizer 214 rises out of the ground on the lane's 206 right side. Rail vehicle 252, wanting to go straight on the rail, switches its attachment to right side stabilizer 214 with its right exterior side roller 216 and latches onto the right-side stabilizer 214. Vehicle 254 wanting to go to the left continues latching on to the left side stabilizer 210 with their left exterior side roller 256. Point 260 on the track is a junction decision point (DP) before which all rail vehicles must commit to go right or left by choosing attachment to the right-side stabilizer 214 or left side stabilizer 210.

Section 242 (E) is a switching section. At section E the vehicles going on the left rail are pulled to the left by their left exterior side rollers 212 or 256 on the left side stabilizer 210. Vehicles going right, such as vehicle 252, are pulled to the right by their right exterior side roller 216 pulling on the right-side stabilizer 214. At section F 244 vehicles continue their new rails. Thus, rail switching occurs on section E.

At section E a floor 218 may be provided to keep rail wheels supported while switching, or crossing support rails may be employed, as illustrated.

At section 244 (F) the right-side stabilizer may optionally be eliminated for vehicles going east-northeast, with all vehicles holding onto a left side stabilizer 230. For rail vehicles going east a left side stabilizer 248 appears and vehicles can latch onto it. Optionally, both side stabilizer, 214 and 248, can be maintained to keep conventional vehicles "C" isolated. Support rails are provided for rail vehicles in sections C through G, reducing rolling resistance.

At section 246 (G) vehicles continue to their destinations.

This track system drawing illustrates an entry point to the track system, separation of conventional and rail vehicles, and switching on the track system.

This system can be operated with vehicles traveling to the west to show track combining and transitioning back to conventional paved roads. Likewise, the entire system can be exchanged left-to-right and right-to-left for countries with travel down the left side of their paved roads, such as England, India, and Japan.

A vehicle approaching a decision point on a track, must make a binary solution on which route to take by attaching to a left or right-side support. Thus, a route from where a vehicle is to where it wants to go can be mapped by a series of right or left decisions occurring just before junction decision points.

A rail vehicle may choose to attach to side support rail 214 and stay in right lane 208. Optionally, support rails may be cast into the pavement in right lane 208. Sunken support rails reduce rolling resistance for rail vehicles and do not impede conventional vehicles.

DESCRIPTION FIG. 3

Figure 3:
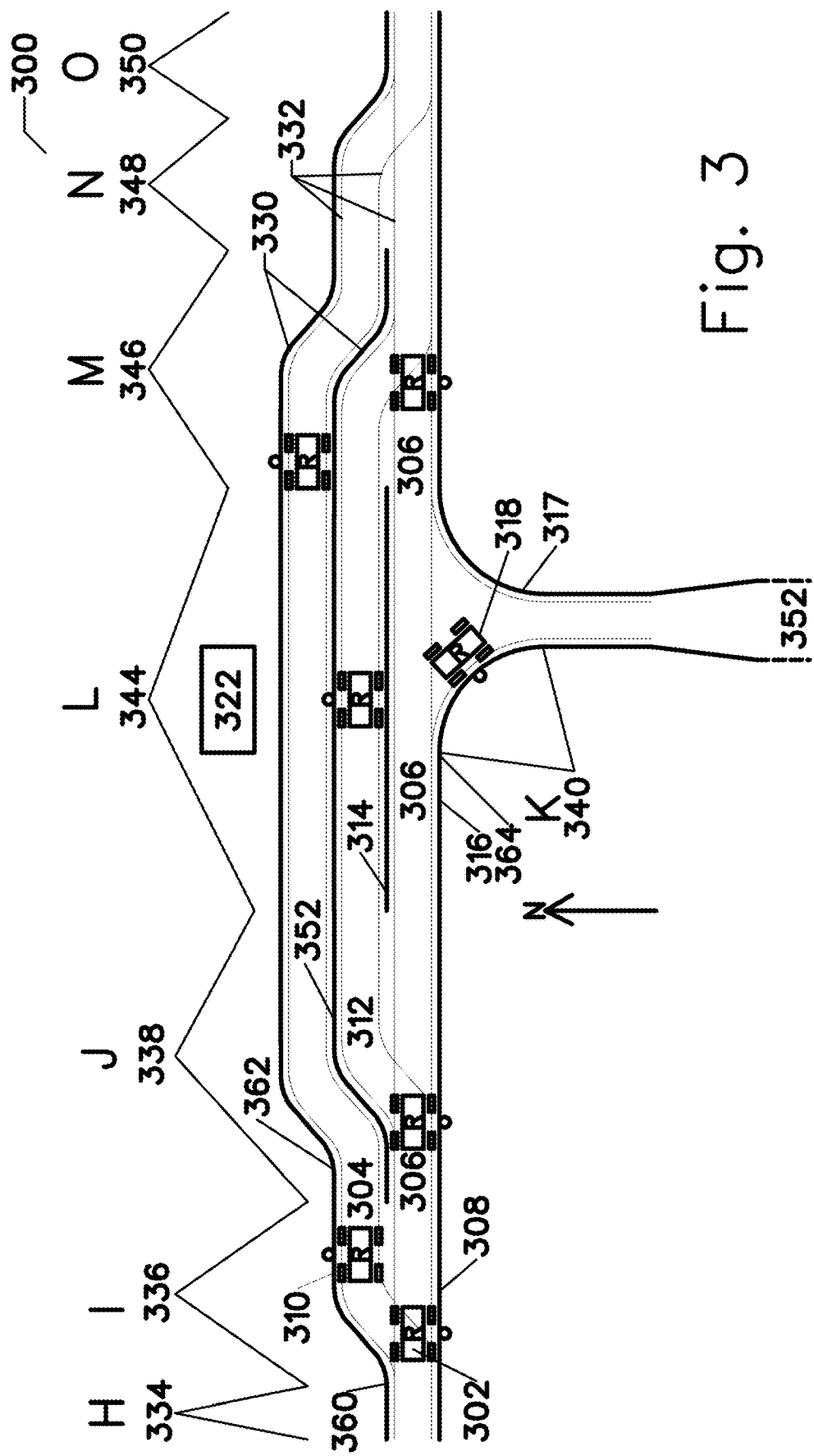
FIG. 3 is a top view of a track system with multiple junctions that illustrates more features of this track system.

FIG. 3 is a top view 300 of a track system that illustrates several features, including potential passenger loading and unloading, vehicle passing, lane changing, exiting a track system onto a paved road system, or connecting to another track system. In this figure only rail "R" vehicles, such as vehicle 302, are allowed to travel. Heavy solid lines, such as 330, are the locations of side stabilizers. Lighter solid lines, such as 332, are the locations of the horizontal portion of support rails which support vehicles. Observe that horizontal support rails cross over each other, and vehicles can traverse these crossings because rail wheel bottoms are essentially flat. That is, they do not have flanges.

Over track section 334 (H) all rail vehicles are moving east, to the right. At section 336 (I) a second track lane 304 has been created on the left, making a junction. Vehicles that want to be on the right track 306 grab the right-side stabilizer 308 and vehicles that want to be on the left track 304 grab the left side stabilizer 310.

At section 338 (J) another track 312 has been created with another stabilizer 314 appearing and again vehicles may choose what track to use by grabbing left side stabilizer 352 or right side stabilizer 308.

At section 340 (K) a vehicle 318 exits to the right by grabbing the right-side stabilizer 316, and any vehicle not wishing to exit grabs the left side stabilizer 314.

At section 344 (L) passengers or goods may be dropped-off or picked-up at pickup zone 322. Also, in section 344 vehicles may pass each other, exit, or enter the track system from a road 352. At section 344 a vehicle (not illustrated) may enter the rail system by grabbing right side stabilizer 317. A vehicle grabbing stabilizer 316 would not be allowed because traffic direction is one-way, to the east.

At section 346 (M) vehicles merge from 3 rail lanes down to 2, essentially the opposite operation of 338 (J).

At section 348 (N) vehicles merge from 2 rails down to 1, essentially the mirror operation of 336 (I).

At section 350 (O) travel resumes, essentially the opposite operation of 334 (H). Junction decision points (DP) 360, 362, and 364 are illustrated. At DP 360 a vehicle decides to go onto track 304 or 306. At DP 362 a vehicle decides to go onto track 314 or remain on track 306. At DP 364 the vehicle decides to remain on track 306 or go onto a paved road 352. There is no DP associated with a combining of tracks, as no choice is available, only collision avoidance. The vehicles attach to the only remaining side stabilizer. Collision should be avoided by the TCS and vehicle sensors in the case of TCS failure or wireless interference.

Sections are shown shortened for illustration purposes.

Thus, the essential functionality of a super-highway system can be implemented with this track system.

Optionally, two separated parallel side stabilizers can be provided on stabilizer 352 and 314 to prevent contact of retractable exterior side rollers when vehicles in adjacent lanes are passing, or extra space can be allowed to avoid any vehicle contact.

DESCRIPTION FIGS. 4A-4H

Features of any of the rail configurations can be combined with features of other rail configurations to create new configurations. It is anticipated the most used construction material for the rail will be steel and concrete. Steel may be rolled, welded, or fabricated from existing conventional rails. Materials such as wood, steel and concrete may be employed for rail ties. Gravel is commonly used for rail beds. Support systems may vary depending on soil, support, drainage, etc. It is a goal of track systems to support the maximum weight vehicle with a minimum of material utilized, provide a low deflection under load and have a long service life with low maintenance. Low noise and minimal use of real estate are also considerations.

The side stabilizer associated with a rail may be provided on one or both sides for contact with interior side rollers and exterior side rollers. The side stabilizers can also optionally be used to help support vehicle weight. Side rollers are not illustrated in some figures. Only cross-sections of the left rail structures are illustrated. The right side may be mirror-symmetric or be missing a side stabilizer.

FIG. 4A is a cross-sectional view 400a of a conventional baseline rail 402 with a side stabilizer 404, with a mirror-symmetrical rail on the opposite side, not illustrated. A bracket 406 connects a flat portion 408 of rail 402 with the side stabilizer bar 404. The rail has horizontal surface 410 over which rail wheels roll. Side stabilizer bar 404 has an interior side surface 412, and an exterior side surface 414. The interior side rollers make contact with the interior vertical surface 412 and the exterior side rollers make contact with the exterior vertical surface 414. Flat bar rails are not known for structural rigidity but may be used where structural rigidity is not required, such as when bolted to a rigid reinforced concrete foundation or for light loads.

FIG. 4B is a cross-sectional view 400*b* of a rail 426 that has a bent portion 418 on the side stabilizer bar 420 which allows a vehicle to make a faster turn without derailing. Exterior side roller 422 contacts tilted surface 424. The bend angle ⊙ may vary.

FIG. 4C a cross-sectional view 400*c* of a rail 428 that has an extension 430 which allows, optionally, for the side rollers to contact surface 432 or 438 while the exterior side rollers contact surface 434. Optionally an insulated power contact surface 436 can contain a conductive strip for providing electrical power for the vehicle, with the grounded rails providing a return path for the electrical current.

FIG. 4D a cross-sectional view 400*d* of a rail 447 that employs an I-beam 440 with a side stabilizer bar 442 attached. Relative to a flat plate, this I-beam can carry additional load, allow increased distance between support points, or allow clearance from ice, snow, and water. Support points may be railroad ties placed over a gravel foundation.

Another optional feature of FIG. 4D is a top side roller 444 with a long interior flange 446 and a long exterior flange 448. The top side roller 444 may be lowered from above with a swing arm (not illustrated) when a vehicle mounts the rail 447. Optionally, a non-flat top surface 443 can be employed on top of side stabilizer 442. The contour of the non-flat top surface and contour of exterior side roller may be similar to a standard rail. This design provides centering and infrequent contact of interior flange 446 and exterior flange 448 with the side stabilizer 442. The top side roller 444 may optionally support some of the weight of the vehicle. Top side roller 444 can be used in place of interior side rollers and exterior side roller. Top side roller 444 can be lifted for track switching with a swing-arm (not illustrated) attached to a vehicle.

Thus, flange 446 provides the side stabilizer functionality of an interior side roller and flange 448 provides the side stabilizer functionality of an exterior side roller. Together they maintain the vehicle's rail wheels over the support rail 447.

The height of side stabilizer 442 may be lowered so that top surface 443 is at or close to the horizontal surface of the rail 447. This allows road vehicles to cross the track at a road crossing. A recessed groove (not illustrated) can be fabricated into the rail 447 to prevent flange 446 interference.

FIG. 4E a cross-sectional view 400*e* of a rail 451 that illustrates a side stabilizer bar 456 with a rounded top 450 which is offset. Exterior side roller 452 has a cylindrical shape 454 for contact with the exterior of the side stabilizer bar 456. Should the vehicle start to tip, conical surface 458 would contact the rounded top 450, preventing the vehicle from derailing or rolling over. This rounded top can be installed only for curves, if desired.

This rounded contact surface construction is sometimes used by roller coasters and allows inverted operation. Rollers contacting the rounded top 450 could be concaved to match the rounded top 450 of the side stabilizer bar.

FIG. 4F a cross-sectional view 400*f* of a rail that illustrates a rail 466 with a non-flat surface 460. That is, it contains a peak 462 approximately in the center, and sloping surfaces from both sides of the peak. This rail is contacted with a matching rail wheel 464 with a shallow groove in the middle of the wheel and flat portions towards the outsides, as illustrated. This peak provides a natural centering for the vehicle on the rail, and provides compatibility with conventional rail wheels, which are slightly conical.

FIG. 4G a cross-sectional view 400*g* of a rail 470 that illustrates an inverted side stabilizer bar 472. Interior side roller 478 contacts surface 474 of inverted side stabilizer 472 and exterior side roller 480 contacts surface 476 of inverted side stabilizer bar 472. An axle 479 of the interior side roller is attached to the vehicle. An axle 481 of exterior side roller 480 has a rotatable attachment to the vehicle through shaft 475. When the vehicle wants to detach from the side stabilizer, the axle 481 is rotated from vertical alignment to horizontal, allowing exterior side roller 480 to be extracted. Ninety degrees of axle rotation is anticipated on shaft 475, but more than 90 degrees is possible.

FIG. 4H a cross-sectional view 400*h* of a rail 490 with a side stabilization that is provided by a recessed groove 482 in the rail 490, as opposed to verticals bars illustrated in FIG. 4A-4G. A dual-flange wheel 484 with outside flange 486 and inside flange 487 sits in the recessed groove 482. The dual-flange wheel 484 rotates around axle 488. The recessed groove provides lateral (side-to-side) stabilization for a vehicle. A rail wheel 496 contacts horizontal support surfaces 492 and rotates around axle 498. A rail wheel may be a dual-mode wheel, or a single-mode wheel. If single-mode, road wheels (not illustrated) should be provided.

The dual-flange wheel 484 may support a portion of the weight of the vehicle, or it may just be prevented from rising, which could potentially cause a derailment. When the vehicle comes to a junction, the right or left dual-flange wheel must be raised to determine which route the vehicle takes. The embodiment in FIG. 4H may be considered to be a female analog of the male embodiment in FIG. 4D.

Optionally, the dual-flange wheel provides no vertical (weight) support, but only side-to-side support. If only lateral support is desired the cylinders 497 and 498 on either side of the dual-flange can be omitted. Optionally, vertical support can be supplied on just one side or the other.

DESCRIPTION FIG. 5A-5B

FIG. 5A is a side view 500*a* of a hybrid vehicle 502 utilizing different wheels for road travel than rail travel. That is, wheels are single-mode, not dual-mode. If travel is on gravel, on dirt, or on uneven surfaces, dual-mode wheels are not likely to be suitable for both roads and rails. Road wheels should be suitable for road surfaces which vary, and rail wheels ideally are hard to provide low rolling resistance over hard surfaces. Rail wheels 506 and 508 are illustrated down on rail 528 and road wheels 510 and 512 are suspended in the air. Rail wheels 506 and 508 are situated towards the center of the vehicle 502. Road wheels 510 and 512 are situated on the outside. Optionally, the rail wheels can be situated on the front and back, or a rail wheel follows a road wheel, or a road wheel follows a rail wheel. Both road and rail axles are supported by rocker mechanisms 514 and 516. Rocker mechanisms 514 and 516 swing around pivots 518 and 520. Rotation of the rocker mechanism can be done via actuator, hydraulic, mechanical, or other means. The rail and road wheels are illustrated as approximately the same size, but that also is optional. Likewise, they can be driven together, or they can be driven separately. Interior side rollers 522 and 524 are optionally retractable and illustrated in the down position.

FIG. 5B is a side view 500*b* that Illustrates the vehicle 502 traveling on road 530. In this configuration the road wheels 510 and 512 are down and the rail wheels 506 and 508 are elevated. Interior side rollers 522 and 524 are shown retracted, folded up under vehicle 502. On road steering can be accomplished by several techniques such as by rotating rocker mechanisms 514 and 516 around a vertical pivot, or skid steering. Retractable exterior side rollers are not illustrated. Four-wheel steering should be considered if vehicle 502 is long or if the track makes sharp bends.

DESCRIPTION FIGS. 6A-6B

FIGS. 6A-6B illustrate 2 wheels, a road wheel and a rail wheel. On a vehicle multiple of these wheel sets could be used.

FIG. 6A is an end view 600a of a rail 628 supporting a rail wheel 606. Road wheel 610 is turned sideways and contacting an interior surface of side stabilizer bar 630 and acting as an interior side roller. The rail wheel 606 rotates around rail axle 612 and road wheel 610 rotates around road axle 614. Pivot 616 is fixed to a vehicle's chassis, or chassis suspension, and rotates in an axle holder 618. When the road axle 614 is horizontal the road wheel 610 is supporting the vehicle. When the road axle 614 is vertical (as illustrated) the road wheel becomes an interior side roller, and the rail wheel 606 supports the weight of the vehicle. The rail axle 612 maintains a horizontal position.

FIG. 6A also contains a side view 601a showing the like-numbered components from the side. This view illustrates that the road wheel 610 is in front of the rail wheel 606, assuming vehicle movement to the left.

FIG. 6B is an end view 600b of a road 630 supporting road wheel 610 which now has its axle 614 situated horizontally. The rail wheel 606 is now suspended in air.

FIG. 6B also contains a side view 601b illustrating the rail wheel 610 contacting a road 630 and the rail wheel 606 suspended in air.

Multiple pivot mechanisms are anticipated, including 4-bar mechanisms. Additionally, many more wheel raising and lowering mechanisms are anticipated, including retractable landing gear designs employed on aircraft.

DESCRIPTION FIG. 7

Figure 7:
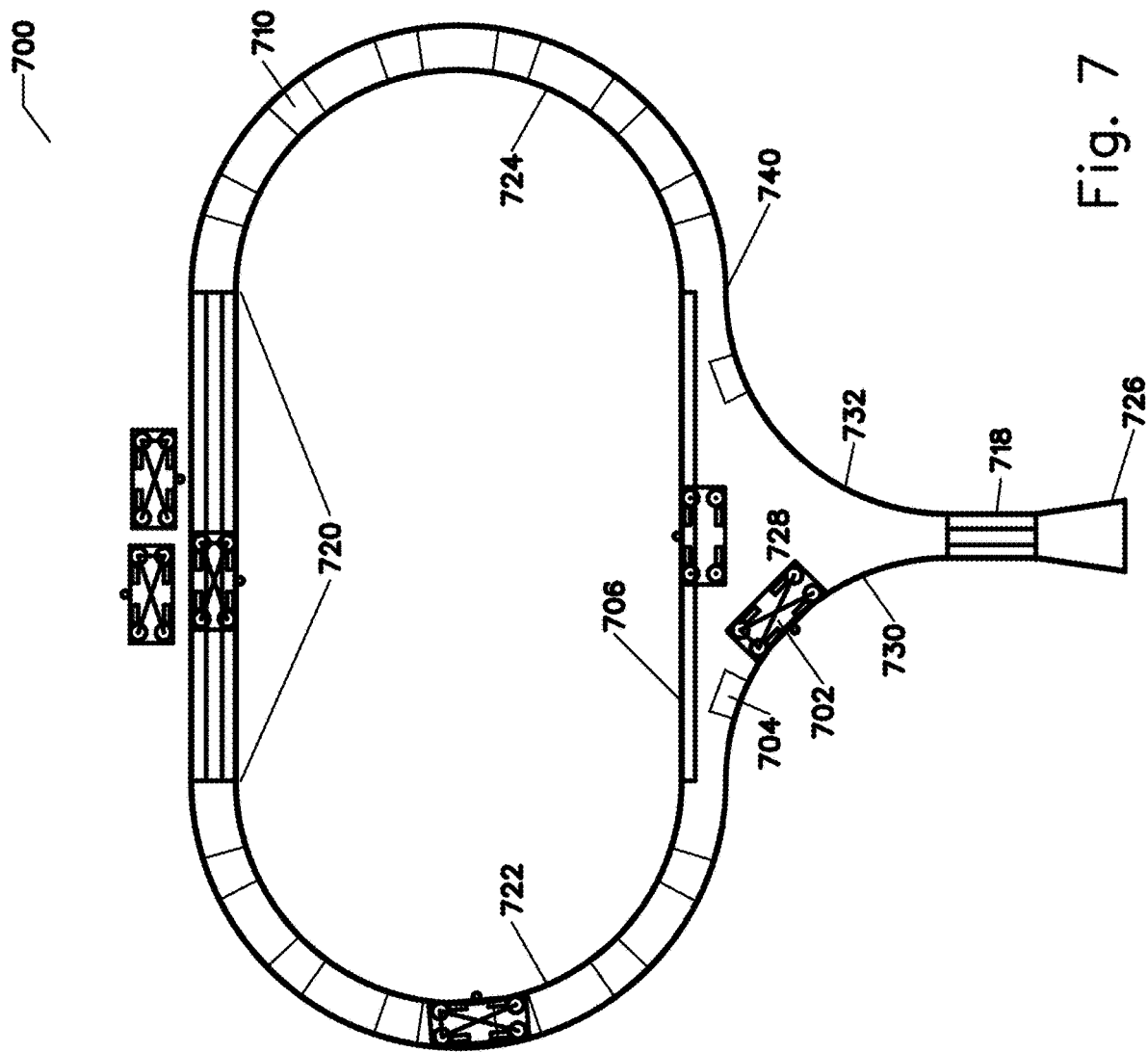
FIG. 7 is a drawing of a model vehicle track illustrating features of this invention.

FIG. 7 is a top view drawing 700 of a hybrid model vehicle track 740 illustrating features of this invention. The model can be used to demonstrate features of a full-scale system or used at model scale for hobby, toy, racing, sales, entertainment, and development purposes. The track is oval shaped with straight rail section 720 and straight section 718 constructed from 1.25 by 1.25" (31.75 mm by 31.75 mm) L-shaped steel angle which is 0.125" (3.175 mm) thick. The curved sections 722 and 724 were formed by bending 2" (50.8 mm) flat bar which is 0.125" thick. The outside radius is approximately 21" (533 mm.). Welded steel ties, such as 710, maintain the steel sides at a constant separation of 82 mm interior distance. On the curved sections of the track 722 and 724 the floor is made from 0.75" (19.05 mm) plywood situated over the ties. Transition from road travel to rail travel occurs at point 726. This track can be used for both dual-mode road/rail wheels, and dual-mode wheels or single mode road and rail wheels.

A vehicle can enter the track at point 726, go left or right at junction decision point 728. After going around the track, the vehicle 702 can continue straight by grabbing side stabilizer 706 or exit the track by grabbing side stabilizer bar 730 or side stabilizer bar 732. The vehicle 702 can change directions traveling around the track from counterclockwise to clockwise. This turn-around is accomplished by moving into junction 728 while grabbing side stabilizer 730, and then backing out while grabbing side stabilizer 732.

DESCRIPTION FIG. 8A

FIG. 8A is a bottom view drawing 800a of a model vehicle 802 with dual-mode wheels. This model operates on the track illustrated in FIG. 7. This drawing shows relative locations of most vehicle components. Dual-mode means that same wheels, such as rear wheel 808b and 810b, and front wheels such as 808a and 810a can be used for both on-rail operation and on-road operation. Not all objects are illustrated in all views for clarity. This drawing has rails 804a and 806a partially illustrated with dashed lines. Plastic parts were made on an 3-D printer using PLA (poly lactic acid) material. This material can be used as a structural material and as a bearing material, although not as good as nylon. Tires for wheels, such as tire 850, were made from 4 mm polyurethane solid tubing which was welded by heating both ends to form a circle. It is then stretched onto a groove molded into dual-mode wheels. The chassis 820 is constructed on a 3.175 mm. thick sheet of aluminum.

Side rollers, such as front side rollers 812a and 814a and rear side rollers 812b and 814b contact interior surface of side stabilizer bars 804f and 806f while on a rails 804a and 806a, shown as dashed lines. Exterior side roller 816a is attached to left exterior side arm 822 and makes contact with the exterior of the side stabilizer 806f while on the rail, keeping the side rollers 812a and 812b in contact with the interior of the side stabilizer 806f. Exterior side roller 816b is supported by exterior side arm 824 and is elevated. Vehicle control is done with a RC radio using a radio control receiver (not illustrated). Power is provided by a lithium polymer battery (not illustrated), and propulsion is done with a DC motor 840, and a motor controller (not illustrated). The battery, the radio control receiver, and the motor controller are mounted on the chassis 820 above the motor 840. A worm gear 842 attaches the motor's shaft to the rear axle 844b. Rear axle support 846a and 846b hold the rear axle 844b. Front wheels are supported by front axle 844a which is supported by front axle supports 848a and 848b. These components are available from many hobby shops or can be purchased on-line. The RC transmitter used was a Spektrum DXe and the RC receiver used was a Spektrum SPMAR620 DSM2/DSMX 6-channel receiver. Shafts and axles are 5 mm in diameter.

DESCRIPTION FIG. 8B

FIG. 8B is a side view drawing 800b. Objects have same numbering between views. Articulated steering, which can be active for both road travel and rail travel, is employed using steering pivot 826, and steering assembly 828 is fabricated with another 3.175 mm. thick sheet of aluminum. Steering servo 830 (not illustrated in FIG. 8A) changes vehicle direction by pushing or pulling on push rod 844. If steering is used on the rail, tighter turns can be made without interference from side stabilizer bars. Pivot arm servo 832, using push rod 860 rotates the left and right exterior side arms 822 and 824 to force exterior side rollers 816a or 816b to contact the left or right side stabilizer bars 804f or 806f while on the rail. While on the road, the exterior side arms are held in an elevated position.

DESCRIPTION FIG. 8C

FIG. 8C is an end view drawing 800c.

DESCRIPTION FIG. 9

FIG. 9 is a top view 900 of a long vehicle 920 making a relatively sharp turn on a curved section of track 904. Point

11

930 is the center of an arc made by the tracks. The long vehicle could be designed to transport freight or provide a tram-type service. The long vehicle can be towed by an engine (not illustrated) or travel under its own power. The support rails 902 are illustrated with a thin line, and the side stabilizers 906 are illustrated with a thick line. The long vehicle is supported by a front undercarriage 910 with a rotary joint 908 and a rear undercarriage 912 with a rotary joint 914. The joints 912 and 914 rotate and connect the undercarriages to the underside of the long vehicle 920. The undercarriages 910 and 912 ride on support rails 902 and support the weight of the vehicle. Side stabilizers maintain the rail wheels on the support rails. Components of each undercarriage are 2 rail wheels 926 typ., 4 interior side rollers 922 typ., and 2 exterior side rollers. Only left exterior side rollers 923 and 924 are illustrated and are in a lowered position. Rotation of the undercarriages 910 and 912 allow the long vehicle to make a much sharper turn than non-rotating fixed undercarriages. The interior side rollers and exterior side roller steer the undercarriages over support rails.

Alternately, exterior side rollers on the opposite side can be lowered. Optionally, one of the two side stabilizers can be eliminated for this section of rail since it does not have a junction.

If the long vehicle 920 is carrying a heavy weight, additional axles can be added to the undercarriages. For making tight turns, axles on a carriage may need to rotate independently. While in a turn, lines drawn through the axles should intersect at point 930. Rail wheels can rotate on their axles independently or together, but if they rotate together some slippage will occur on a turn.

A description of FIG. 9 can be repeated with stabilizer bars replaced by recessed grooves and exterior and interior side rollers replaced by dual-flange wheels.

An alternative to a long vehicle is shorter vehicles coupled together, forming a train. Cars on the train can be supported by a single carriage or two carriages. Towed two wheeled trailers are also a vehicle configuration capable of either rail or road travel. On rails, trailers can also be pushed, but this is unstable for road travel.

DESCRIPTION FIG. 10A

FIG. 10A is a front view of a grab arm 1002 latched onto a side stabilizer bar 1026 of a rail 1028. The grab arm 1002 contains an interior side roller 1006 and a retractable exterior side roller 1008. The grab arm 1002 uses a four-bar linkage. First pivot point 1010 and second pivot point 1012 are both attached to a vehicle chassis. Third pivot point 1016 and fourth pivot point 1014 rotate. The 4-bar linkage consists of a connecting linkage 1020 connected between third pivot point 1016 and fourth pivot point 1014. It also contains a first linkage 1022 between first pivot 1010 and third pivot point 1016. A second linkage 1024 is between fourth pivot point 1014 and second pivot point 1012. To release the grab arm 1002 from the side stabilizer bar 1026 the first linkage 1022 is rotated counterclockwise with an actuator.

In practice at least one grab arm is situated on either side of a vehicle. Grab arms can be actuated with a linear or rotary actuator, or manually cranked. An actuator is not illustrated. The mechanism can also be designed to be locking while grabbing the side stabilizer bar 1026. This could be used for safety enhancement.

DESCRIPTION FIG. 10B

FIG. 10B is a front view of a grab arm 1002 released from a side stabilizer bar 1026, with like-numbered objects. In one mode of operation, the vehicle is steered or otherwise directed towards the side stabilizer 1026, and when interior side roller 1006 contacts the interior vertical surface 1032, the retractable exterior side roller 1008 descends and grabs the exterior vertical surface 1030. This maintains the vehicle at a fixed distance from the side stabilizer. In another mode of operation, an actuator can cause locking and unlocking from side stabilizer bar 1026.

DESCRIPTION FIG. 11A

FIGS. 11A and 11B are comparison drawings showing different embodiments of side stabilizers at junctions. Note that the wheels illustrated are single-mode or dual-mode rail wheels supporting the weight of the vehicle, and none of the illustrated wheels need lifting. Dual-flanged wheels, interior side rollers, and exterior side rollers are not illustrated.

FIG. 11A contains a top view 1100a of a rail junction using vertical bars 1104a and 1106a as side stabilizers. Chassis of vehicles 1102a, 1102b, and 1102c are illustrated as simple "X"s and only weight-supporting rail wheels are illustrated. Interior and exterior side rollers are not illustrated. Rising vertical stabilizer bars are illustrated as thin solid lines, and horizontal vertical stabilizer bars are illustrated as heavy solid lines. The vertical stabilizer bars rise above support surface level 1140a at points 1142a, 1142b, and 1142c and reach vertical stabilizer bar height 1148 at points 1144a, 1144b, and 1144c. Because the side stabilizers are vertical bars, the rail wheels of vehicles 1102a, 1102b, and 1102c are situated between rails 1104a and 1106a.

End view 1100d of FIG. 11A illustrates the support surface 1140a which may contain support everywhere, such as a concrete surface, or support just under rail wheels, such as steel rails 1154, or steel rails embedded in concrete to support rail wheels.

The side stabilizer embodiment of FIG. 11a has advantages of being relatively easy to keep free of snow and debris. A disadvantage is that at a road crossing, the vertical bar side stabilizer presents an obstacle to cross-traffic.

DESCRIPTION FIG. 11B

FIG. 11B contains a top view 1100b of a rail junction using recessed grooves 1104b and 1106b as side stabilizers. Chassis of vehicles 1102d, 1102e, and 1102f are illustrated as simple "X"s and only rail wheels are illustrated. Dual-flanged wheels extending into recessed grooves are not illustrated. The recessed grooves sink below support surface level 1140b at points 1142d, 1142e, and 1142f and reach bottom of recessed groove depth 1152 at points 1144d, 1144e, and 1144f. Rail or dual-mode wheels on vehicle 1102d remain outside the recessed grooves, rail or dual-mode wheels on vehicle 1102e stay inside the recessed grooves, and rail or dual-mode wheels on vehicle 1102f straddle the recessed groove.

End view 1100d of FIG. 11A illustrates the support surface 1140b which may contain support everywhere, such as a concrete surface, or support just under rail wheels, such as steel rails.

The recessed groove embodiment of FIG. 11B has an advantage of cross-traffic typically being able to bridge and drive over the recessed groove at right angles. The disadvantage of the recessed groove is that it must be kept clean and free of debris by using, for example, brushes or vacuums that are deployed as needed. The recessed groove also presents a danger of wheel capture to bicycles or motorcycles traveling parallel to the recessed grooves. This is a drawback that conventional tram tracks share. But crossing a recessed grooved track should be relatively safe. The recessed grooves should be drained so that they cannot fill with water and kept free of ice and snow.

Another advantage of the embodiment is FIG. 11B is allowing track crossings. With bar side stabilizers track crossings would require removal of both side bars at the crossing. Thus, if a figure eight model track was desired, a recessed grooved track would be easier to implement.

DESCRIPTION FIG. 12A

FIGS. 12A-12D uses the same numbers to identify same objects. This side stabilizer system can also use the track layouts and track switching illustrated in FIGS. 2, 3 and 11. The recessed groove stabilizing system may be viewed as an inverse of FIG. 4D, where the male side stabilizer 442 is replaced with a female side stabilizer recessed groove 1222.

Figure 12A:
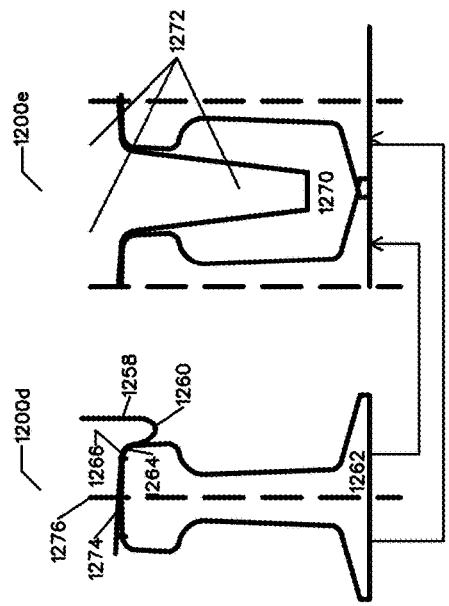
FIG. 12A is an end view of a vehicle on a track with a recessed groove side stabilizer.

FIG. 12A is a front view 1200a of a pair of recessed grooved rails 1204 and 1206, and a vehicle 1202 riding on the rails supported by rail wheels comprised of right rail wheel 1210a, and left rail wheel 1208a. "Right" and "left" are relative to sides of vehicle.

This figure illustrates recessed groove side stabilizer mechanisms that maintains the rail wheels 1210a and 1208a over the rails 1204 and 1206 with a side stabilizer that is formed by 2-sided dual-flange wheels, 1212A and 1214a. Dual-flange wheel 1214a is seated inside a recessed groove 1222 in the recessed grooved rail 1204, while dual-flange wheel 1212a is out of recessed groove 1224 in rail 1206. While one of the dual-flange wheels is lowered, the vehicle cannot roll off the top surfaces of rails 1204 and 1206. On a straight section of track, both 1212a and 1214a can be lowered, but one of them must be raised when a junction is encountered, either at a split or a combination of tracks. The vehicle will follow the recessed groove 1222 or 1224 in the turn, depending on which set of dual-flange wheels is lowered.

The rail wheels as illustrated may be made of rubber and used as dual-mode wheels. That is, the rail wheels may used to support vehicle weight both on-road and on-rail.

Dual-flange wheels, dual-flange wheel axles and rotary arms are illustrated using dashed lines for clarity. Dual-flange wheel 1214a is illustrated as lowered into recessed groove 1222, while dual-flange wheel 1212a is lifted out of recessed groove 1224. Axle 1220a supports rail wheels 1210a and 1208a. Lowered axle 1228a supports dual-flange wheel 1214a and raised axle 1226a supports dual-flange wheel 1212a. Rotary arms 1232a and 1234a pivot around axle 1220a and support dual-flange wheel axles 1126a and 1228a. Front and back rotary arms can be optionally raised and lowered together, and a linear or rotary actuator can be used.

Dual-flanged wheels can optionally be used to support some of the weight of vehicle 1202, or only used for side-to-side stability. Dual flange wheels can contain only flanges, or have shoulders, as illustrated.

Optionally the track system and track support can be sunk into pavement until pavement level 1240 is slightly below the top of the rails. This allows the rails to be placed into the pavement for easy crossing by conventional road vehicles, but the recessed grooves 1222 and 1224 present a hazard to bicycles, as with conventional tram tracks. Also, the recessed grooves can be filled with debris and must be periodically cleaned.

This recessed grooved track system is similar to tram tracks but differs in that the recessed grooves contact the dual flange wheel on two sides. A conventional train or tram may use this track system on straight track by contacting only the inside of the recessed grooves.

At a junction, two recessed grooves allow the vehicle to change tracks by lifting dual flange wheel(s) on one side only. Also, rail wheels 1210a and 1208a do not contain flanges, allowing track changes.

Ties, such as 1230a support both rails. In a tight-radius turn, dual-flanged wheels can be allowed to rise slightly in the recessed groove 1224 and 1222 to avoid binding or interference. Alternately, the width of the recessed groove can be increased.

DESCRIPTION FIG. 12B

Figure 12D:
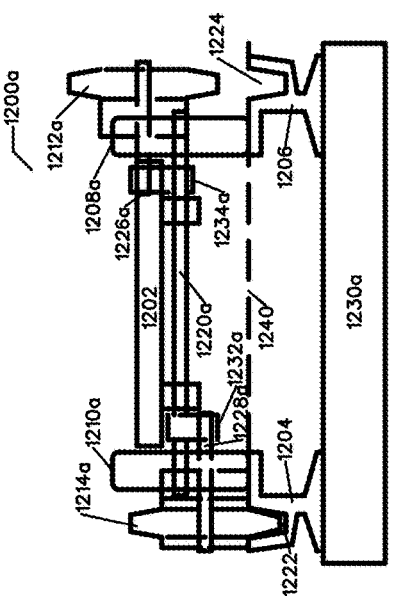
FIG. 12D is an end view illustrating a design of a recessed groove stabilizer.
Figure 12C:
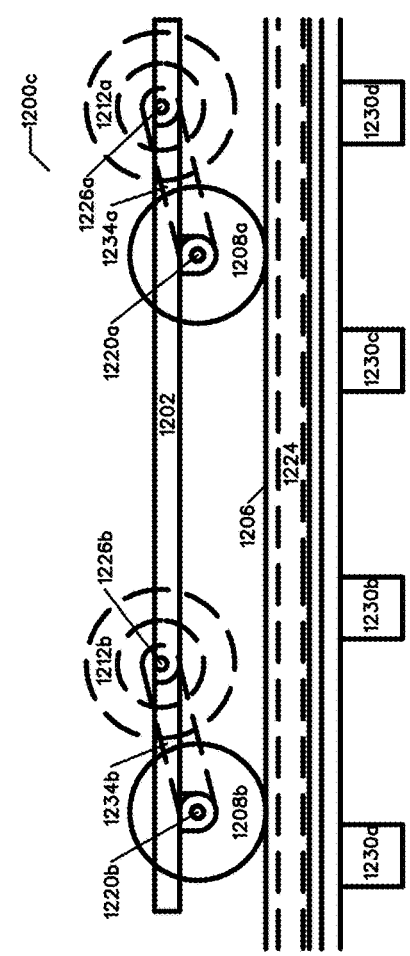
FIG. 12C is a right-side view of a vehicle on a track with a recessed groove side stabilizer.
Figure 12B:
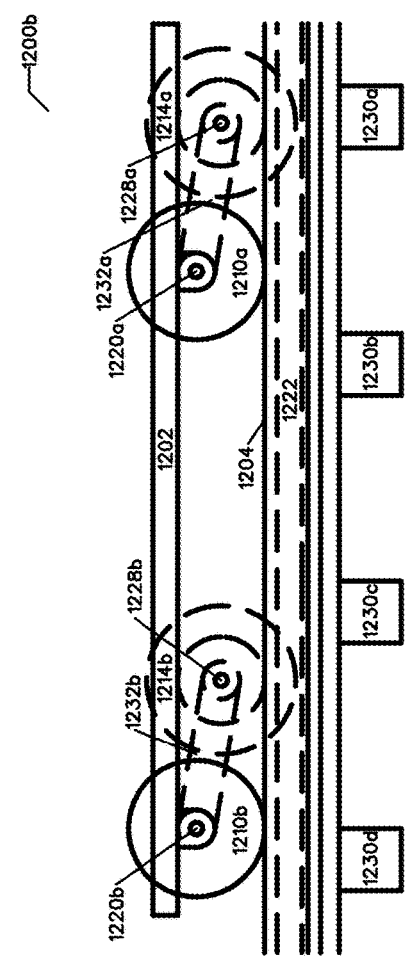
FIG. 12B is a left side view of a vehicle on a track with a recessed groove side stabilizer.

FIG. 12B is a right-side view 1200b of vehicle 1202 showing dual-flange wheels 1214a and 1214b lowered into rail recessed grooves 1222. The front of the vehicle is on the right. Rail wheels 1210a and 1210b are rolling on the rail 1204 and support some or all the weight of the vehicle 1202.

DESCRIPTION FIG. 12C

FIG. 12C is a left side view 1200c of vehicle 1202 showing dual-flange wheels 1212a and 1212b lifted above rail recessed grooves 1224. The front of the vehicle is on the right. Rail wheels 1208a and 1208b are rolling on the rail 1206 and support the weight of the vehicle 1202. For road travel all four swing arms 1232a, 1232b, 1234a and 1234b will be raised.

DESCRIPTION FIG. 12D

FIG. 12D describes a possible construction of a recessed groove side stabilizer.

FIG. 12D illustrates a left view 1200d of a cross section of a conventional track system that has a conical steel rail wheel 1258 with flanges 1260 only on the interior. Only the left rail is illustrated. The conical slope 1274 is about 20:1. The rail wheel contacts rail 1262 that is curved or contoured on the top 1264. Unless a rail is damaged, the single flange 1260 should not contact the rails on straight sections of track. Contact can sometimes occur on curves. The contour of the tops of the rails 1264 along with the contour of the wheels 1266 cause vehicles to seek a center between the two conventional rails when moving.

This same stabilizing method can be employed in forming a contour of a side-stabilizing recessed groove and dual-flange wheels.

FIG. 12D also illustrates a right view 1200e which is a cross sectional view of a recessed groove 1270 in a side stabilizer that is contacted by a 2-sided dual-flange wheel 1272. If the rail 1262 is split down the middle, as shown by dashed line 1276 and the two halves are rearranged by swapping sides, recessed groove 1270 can be formed. Thus, contours on conventional rails and rail wheels can be reused to make a side stabilizer recessed groove 1270 and dual-flange wheel 1272. Additional tolerance on a curved section of track may be used to avoid binding. Front axle 1220a and back axle 1220b can be held parallel to each other or allowed to rotate with respect to one another.

Dual-flange wheels may support some or all the weight of the vehicle 1202 or they may only be used for side-to-side stabilization.

Rail Steering, Breaking, and Drive Discussion

When rail or dual-mode wheels are employed on a vehicle riding on a rail, steering, and drive can be similar to conventional automobiles, which are made with very many design variations. However, steel rails can be more slippery than road pavement, and improvement in breaking and drive traction can be made by applying breaking or drive to the interior side rollers, or exterior side roller, or both. In this mode, more pressure can be exerted to prevent slipping, as needed. Likewise, brake pads can be used by the vehicle to contact side bars or recessed grooves.

On a rail, for short vehicles and/or gentle turns, rail wheels can rotate together on a common axle, without using separate drives on each drive wheel or differential joints. Optionally, on a rail, steering for a short vehicle's rail wheels can be eliminated using guidance provided by side stabilizers. Rail wheels can optionally be designed with caster to eliminate steering while traveling on rail.

The front axles 1220*a* and rear axles 1220*b* may stay parallel to each other. For sharp turns, independent rotation of wheels and axles is preferred, as is a steering mechanism.

Many other known steering systems, such as skid steering, Ackermann steering, or articulated steering can be used. In the rail mode, a road steering mechanism can optionally be frozen in a straight-ahead direction. Four-wheel steering allows vehicles to make tight turns on rails.

OTHER FEATURES AND ABILITIES

1. Providing communications to vehicles for traffic control and to passenger for entertainment and work can be enabled by fiber optic cables accompanying the tracks and providing data for continuous wireless communication (e.g. Wi-Fi hot spots). Powering for communications and control can be provided by the same electrical system that powers the vehicles. Cables can be underground, overhead, or incorporated into the rails system. The communications system can also provide location data (e.g. Geographic Information System, GIS) or beacons for vehicles that can assist in route and track selection. Vehicle control systems should integrate and exchange sensor data with the automated traffic control system.

2. Dual mode wheels can elevate their tire pressure while on the rails for more efficient rolling and reduce their pressure on the road for better traction and control.

3. Vehicles can live on the rails. That is, exiting the rails and traveling on roads is not a requirement.

4. Recessed grooved side stabilizers can be made with wider recessed groove to accommodate tight turns. Side stabilizer bars can be made narrower to accommodate wide turns, or their spacing can be increased slightly to prevent interference.

5. Towing vehicles are anticipated where an engine tows many cars and/or trailers. These vehicles can be used to tow unpowered vehicles, or for transport of road-only vehicles, or as rail buses.

6. Regenerative breaking is anticipated where energy is returned to a vehicle's battery or the transit's electrical grid.

7. Tailgating to reduce wind drag on the rail is encouraged and can be automatically enabled by the traffic control system.

8. Rope or cable pulling is anticipated, particularly for steep inclines. Cogs or gears can be employed for steep inclines.

9. Long trains can be formed using the rail system describe herein. The side-stabilized rail system can be integrated with both conventional rail systems and conventional road systems.

10. Only one support rail can be used by vehicles. That is, motorcycle-like vehicles can be maintained upright by rolling on one support rail and grasping a vertical stabilizer bar or inserting a dual-flange wheel into a recessed groove.

11. Side stabilizer bar can be lowered to allow car crossings at right angles

12. A transportation system can be built with a single side stabilizer passing down one side of a divided highway (left in the US, right side in UK). A vehicle, in communications with a traffic control system, can attach to the side stabilizer and be guided by it while it remains on the divided highway. The traffic control system controls vehicle speed and spacing. The side stabilizer can be either a vertical bar or a recessed groove. Dual-mode wheels can be employed, and steel rails can be embedded in the pavement. Alternately the steel rails can be exposed. The rails may be used for electrical ground return and power can be provided by the side stabilizer.

13. Conventional single-flange rail wheels can be used on support rails if no switching needed. Compatibility with conventional trains is anticipated.

14. As a design decision, conical or cylindrical rail wheels (without flanges) may be used on either flat or sloped rails.

15. If there are side stabilizer bars situated on both sides of the tracks, lateral stabilization can be done with only exterior side rollers, and no internal side rollers. Alternately, lateral stabilization can be done with only internal side rollers and no external side rollers.

16. One lateral stabilizer mechanism can be used on one side with rail or dual-mode wheels following.

17. Dual-flanged wheels rolling in recessed grooves can support none, some, most, or all of the weight of a vehicle to reduce rolling resistance. Likewise, dual-flanged wheels can provide none, some, most, or all the traction and breaking for a vehicle.

18. When vehicles are formed into a train, they may form common or shared systems for powering, breaking, and communications. One vehicle can take control of an entire train and control speed, decoupling, vehicle admittance, and breaking.

19. Slip coaches or slip cars, which decouple vehicles without stopping, are anticipated.

21. Side bar can be grabbed tightly by vehicle to facilitate braking or acceleration. Likewise, a dual-flanged wheel can expand to grab a recessed groove to facilitate braking, or brake pads may be employed for contact against steel rails, recessed grooves, or bar side stabilizers.

21. Powering may be provided by overhead wires, or by conductors in the rails.

22. Attachment to a stabilizer, either bar or recessed groove, can be done magnetically. A magnetic coil can increase or decrease electrical current to vary the strength of the attachment or release the side stabilizer.

23. Model trains are anticipated, along with competitive races.

24. Only one retractable exterior side roller may be used for either right or left sides, or each side can have a different retractable exterior side roller.

24. For vehicles employing single mode wheels, undercarriages containing rail wheels and side stabilizers can be lowered from the chassis, or road wheels can be raised by the chassis.

25. If dual-mode wheels are employed and they have a high rolling resistance, more weight can be applied to a dual-flange wheel or top side roller 444. In a breaking emergency, the weight can be shifted to the dual-mode wheels for better traction and a quicker stop.

26. The side stabilizer mechanism can be made a movable part of the side stabilizer, either side interior and exterior rollers, or dual-flange wheels. That is, a vehicle can attach to a side stabilizer mechanism when it gets on a rail and detach when it reverts to road operation. The side stabilizer mechanism can get power from the side stabilizer for propulsion and return power to the side stabilizer when breaking.

27. The decision point (DP) is a key distance at which one side stabilizer or the other should have been locked onto. Unlocking should not be allowed until a turn is completed. Automatic traffic control of the side stabilizer is anticipated. However, sometime systems fail, are sabotaged, are tampered with, or break. As a safety feature, mechanical means should be provided to force the diverter to select a side stabilizer and stick with it until after a turn. In the case of no selection by the vehicle/traffic control system, a default direction (e.g. go left) can be chosen.

28. On a system using recessed grooves as illustrated in FIG. 11B, vehicle 1102d, the recessed grooves can be placed next to each other in the center of the track if all vehicles situate their rail (or dual-mode) wheels outside the recessed grooves. One potential disadvantage of this method is increased construction cost and required alignment. Also, the center of the track may be a preferred location for a power contact strip. A center side stabilizer with two recessed grooves could also contain the power contact strip.

What I claim is:

1. A track system comprising:
a first support rail,
a second support rail,
a first side stabilizer associated with the first support rail,
a second side stabilizer associated with the second support rail,
a dual-mode vehicle configured to travel on a road or a support rail,
the first and second support rails engaging rail wheels, interior side rollers contacting the inside of the first side stabilizer or second side stabilizer, and exterior side rollers contacting the outside of the first side stabilizer or second side stabilizer, said exterior side rollers pivotable on a central axis running parallel to said first and second support rails,
wherein said vehicle is configured to attach to the first side stabilizer and release said first side stabilizer and attach to said second side stabilizer to switch to a different track at a track junction, and said vehicle is configured to remove attachment to both side stabilizers to travel on a road.

2. A track system according to claim 1 where the side stabilizer is a bar side stabilizer, and the vehicle attaches to said side stabilizer with an interior side roller and an exterior side roller.

3. A track system according to claim 1 where the side stabilizer is a recessed groove, and the vehicle attaches to said side stabilizer with a dual-flange wheel.

4. A track system according to claim 1 where the side stabilizer is a bar side stabilizer, and the vehicle attaches to said side stabilizer with an interior side roller and an exterior side roller.

5. A track system according to claim 1 where said vehicle releases said first side stabilizer, causing the vehicle to leave the track system and travel on a road.

6. A track system according to claim 1 where said rail wheels are dual-mode wheels mounted on a front and back of said vehicle, said dual-mode wheels comprising road wheels and support rail wheels having separate axles, and a rocker mechanism capable of pivoting the dual mode wheels to engage one of a road or support rail.

7. A track system according to claim 1 where the vehicle has road wheels in addition to rail wheels.

8. A track system according to claim 1 where the track provides an electrical return circuit for power provided from side stabilizer.

9. A track system according to claim 1 where the vehicle operates under the control of a traffic control system.

10. A track system according to claim 1 where conventional trains travel on said support rails.

11. A track system according to claim 1 for changing tracks at a decision point by changing attachments from one side support to another side support.

12. A vehicle according to claim 1 where the side stabilizer is comprised of a side bar (442), a top side roller (444) with a long interior flange (446) and with a long exterior flange (448).

13. A vehicle according to claim 1 where the vehicle applies force to said side stabilizer to improve traction.

14. A system for a vehicle travel comprising a divided highway with a single side support on the left side of a left lane, support rails in the left lane, a vehicle with dual-mode wheels mounted on a front and back of said vehicle, said dual-mode wheels comprising road wheels and rail wheels having separate axles, and a rocker mechanism capable of pivoting the dual mode wheels to engage one of a road or rail, and a side stabilizer attachment means traveling on said divided highway, a traffic control system, where said vehicle in response to commands from said traffic control system, attaches to said single side support.

15. A system according to claim 14 additionally comprising a sliding power connection in said single side support providing electrical power to said vehicle.

16. A track system comprised of a first recessed groove rail (1204) with a top surface, a second recessed grooved rail (1206) with a top surface, a first recessed groove (1222) side stabilizer associated with the first rail, a second recessed groove (1224) side stabilizer associated with the second rail,
a vehicle (1202) traveling on the track system with two front rail wheels (1208b,1210b) supported by the rail top surfaces, and two rear rail wheels (1208a, 1210a) also supported by the rail top surfaces,
a first set of two dual-flange wheels (1212b, 1212b) disposed on the right and a second set of two dual-flange wheels (1214b, 1214a) disposed on the left of the vehicle, said sets of wheels configured to be raised or lowered independently,
a rotary arm (1232) supporting the dual-flanged wheel (1214b), a rotary arm (1232) supporting the dual-flanged wheel (1214a), rotary arm (1234b) supporting the dual-flange wheel (1212b), a rotary arm (1234a) supporting the dual-flanged wheel (1212a), said rotary arms pivot,
where said vehicle maintains the respective front and rear rail wheels over said rail top surfaces by lowering either the left or right set of dual-flanged wheels.

17. A track system of claim 16 further comprised of a junction, where said vehicle makes a left turn at the junction by lowering the left set of dual-flange wheels on the left side and raising the set of dual-flange wheels on the right side.

18. A track system of claim 16 where both set of two dual-flange wheels are raised for travel on a road and front and back rail wheels are dual-mode wheels.

19. A track system of claim 16 where support of the weight may be shifted between the dual-flange wheels and the rail wheels to improve traction and breaking, or to reduce rolling resistance.

20. A track system of claim 16 where both sets of dual-flange wheels are lowered on a conventional track, said conventional track has no recessed grooves.

* * * * *